(12) United States Patent
Marzban et al.

(10) Patent No.: US 12,520,321 B2
(45) Date of Patent: Jan. 6, 2026

(54) USER EQUIPMENT SPECIFIC SEARCH SPACE AND COMMON SEARCH SPACE ASSIGNMENT FOR MULTIPLE SLOT BASED CONTROL CHANNEL MONITORING

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Jae Ho Ryu, San Diego, CA (US); Jing Sun, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 918 days.

(21) Appl. No.: 17/662,051

(22) Filed: May 4, 2022

(65) Prior Publication Data

US 2023/0362944 A1    Nov. 9, 2023

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC .......................... H04W 72/23; H04W 72/0446; H04L 5/0091; H04L 5/0053
See application file for complete search history.

(56) References Cited

U.S. PATENT DOCUMENTS

2023/0189305 A1* 6/2023 Oteri ..................... H04W 48/12
                                                                 370/329
2024/0260010 A1* 8/2024 Davydov .............. H04L 5/0053

FOREIGN PATENT DOCUMENTS

EP          4160964 A1      4/2023
WO      2022213269 A1     10/2022

OTHER PUBLICATIONS

International Search Report and Written Opinion—PCT/US2023/015472—ISA/EPO—Jun. 29, 2023.
Lenovo et al: "PDCCH Monitoring Enhancements for NR from 52.6 GHz to 71GHz", 3GPP TSG RAN WG1 #106bis-e, R1-2109898,3rd Generation Partnership Project, Mobile Competence Centre, 650, Route Des Lucioles, F-06921 Sophia-Antipolis Cedex, France, vol. RAN WG1, No. e-meeting, Oct. 11, 2021-Oct. 19, 2021, Oct. 1, 2021, 7 Pages, XP052058826, Sections 1-6.

(Continued)

*Primary Examiner* — Kibrom T Hailu
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a search space configuration indicating a first configuration for a UE specific search space (USS) that is associated with a first slot group size and a second configuration for a common search space (CSS) that is associated with a second slot group size. The UE may receive, from the network entity, a communication via a downlink control channel based at least in part on monitoring the downlink control channel in accordance with the search space configuration. Numerous other aspects are described.

30 Claims, 15 Drawing Sheets

(56) References Cited

OTHER PUBLICATIONS

Moderator (Lenovo) : "Feature Lead Summary #1 for B52.6 GHz PDCCH Monitoring Enhancements", 3GPP TSG RAN WG1#106-e, R1-2108233, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 20, 2021, Aug. 19, 2021, 102 Pages, XP052042070, Sections 1-3.
Moderator (Lenovo): "Feature Lead Summary for 852.6 GHz PDCCH Monitoring Enhancements", 3GPP TSG RAN WG1#104-e, R1-2103689, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 13, 2021, XP051995264, 71 Pages, p. 36-p. 37, Sections 1-3.
Samsung: "PDCCH Monitoring Enhancements for NR from 52.6 GHz to 71 GHz", 3GPP TSG RAN WG1 #107-e, R1-2111726, 3rd Generation Partnership Project, Mobile Competence Centre, 650, Route Des Lucioles, F-06921 Sophia-Antipolis Cedex, France, vol. Ran WG1, No. e-Meeting, Nov. 11, 2021-Nov. 19, 2021, Nov. 5, 2021, 5 Pages, XP052075012, Sections 1-7.

\* cited by examiner

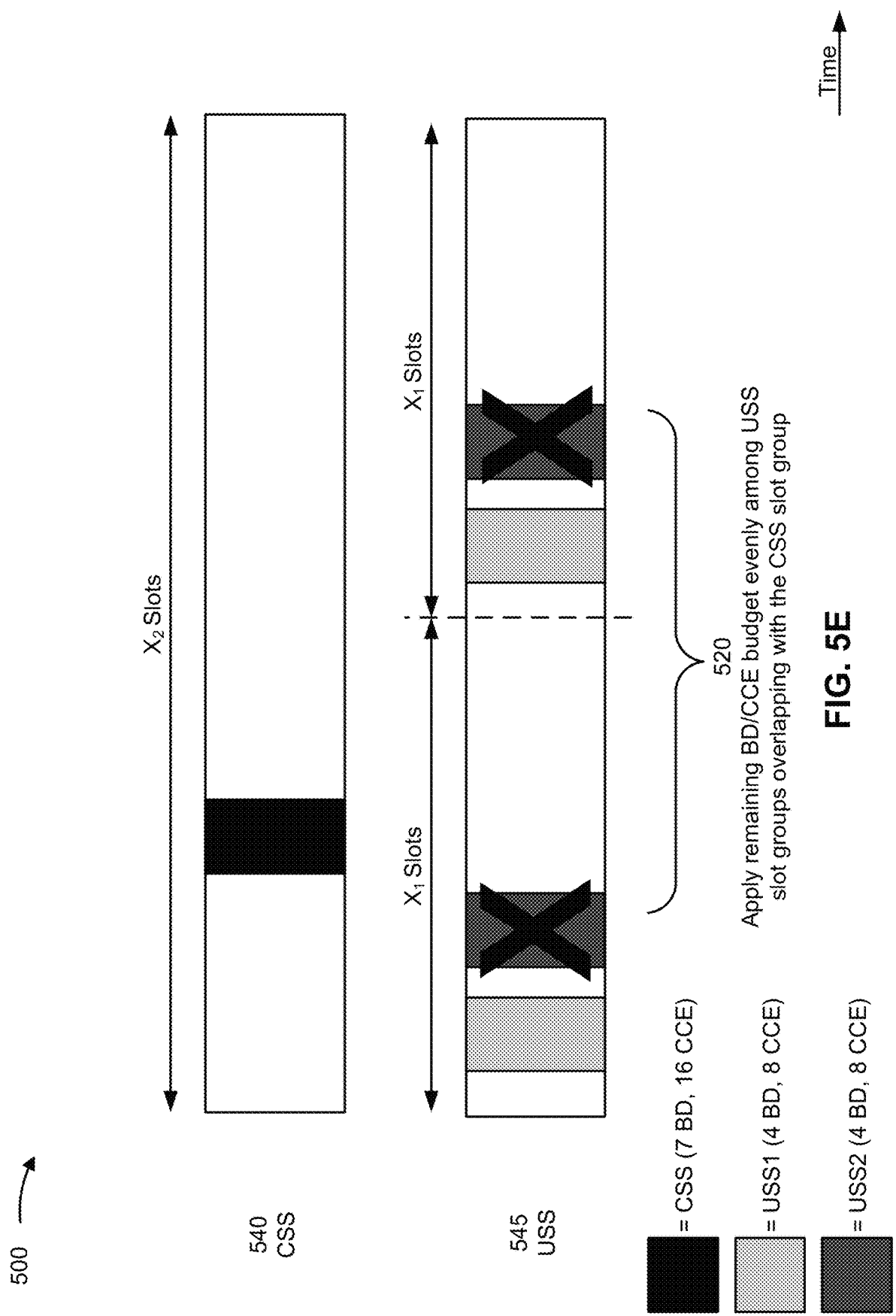

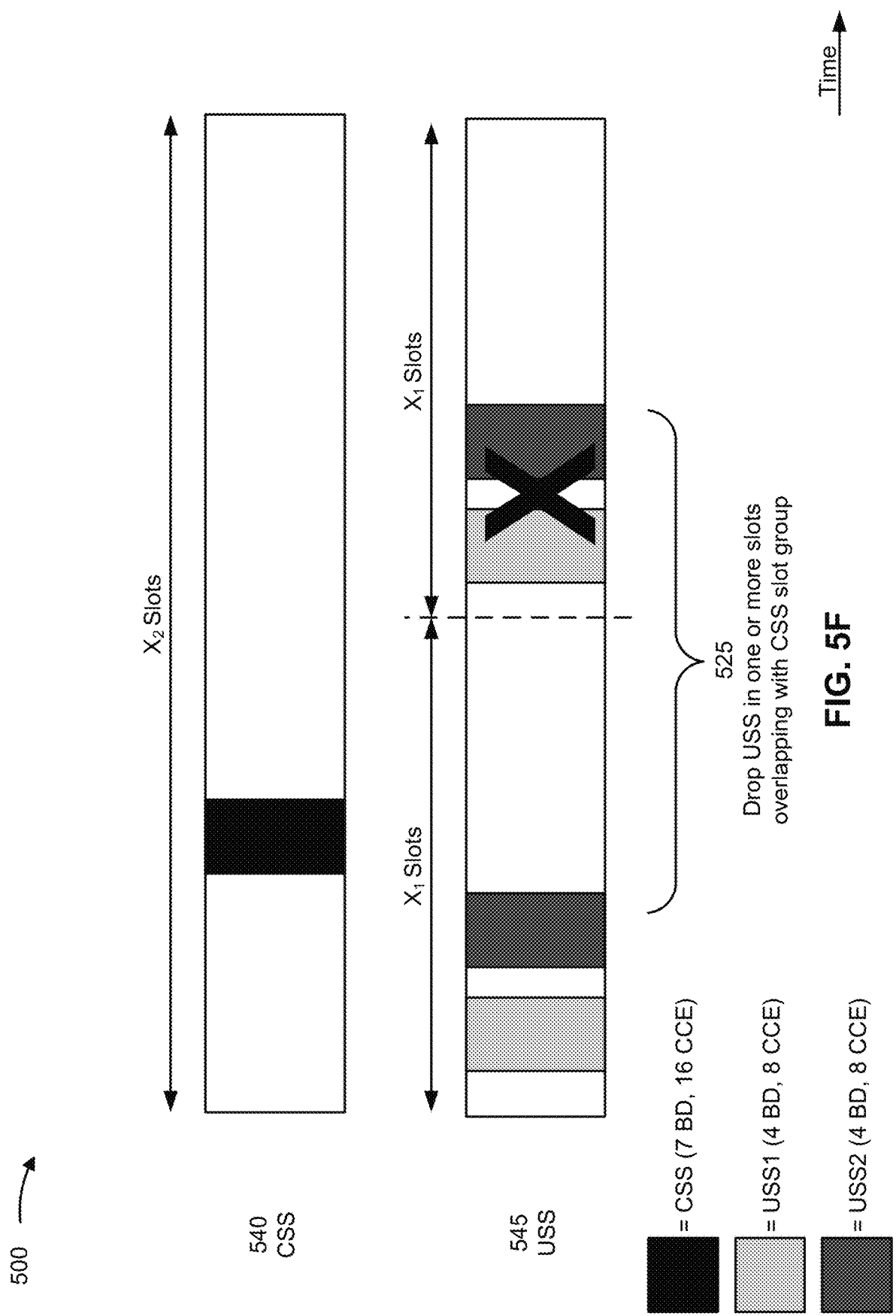

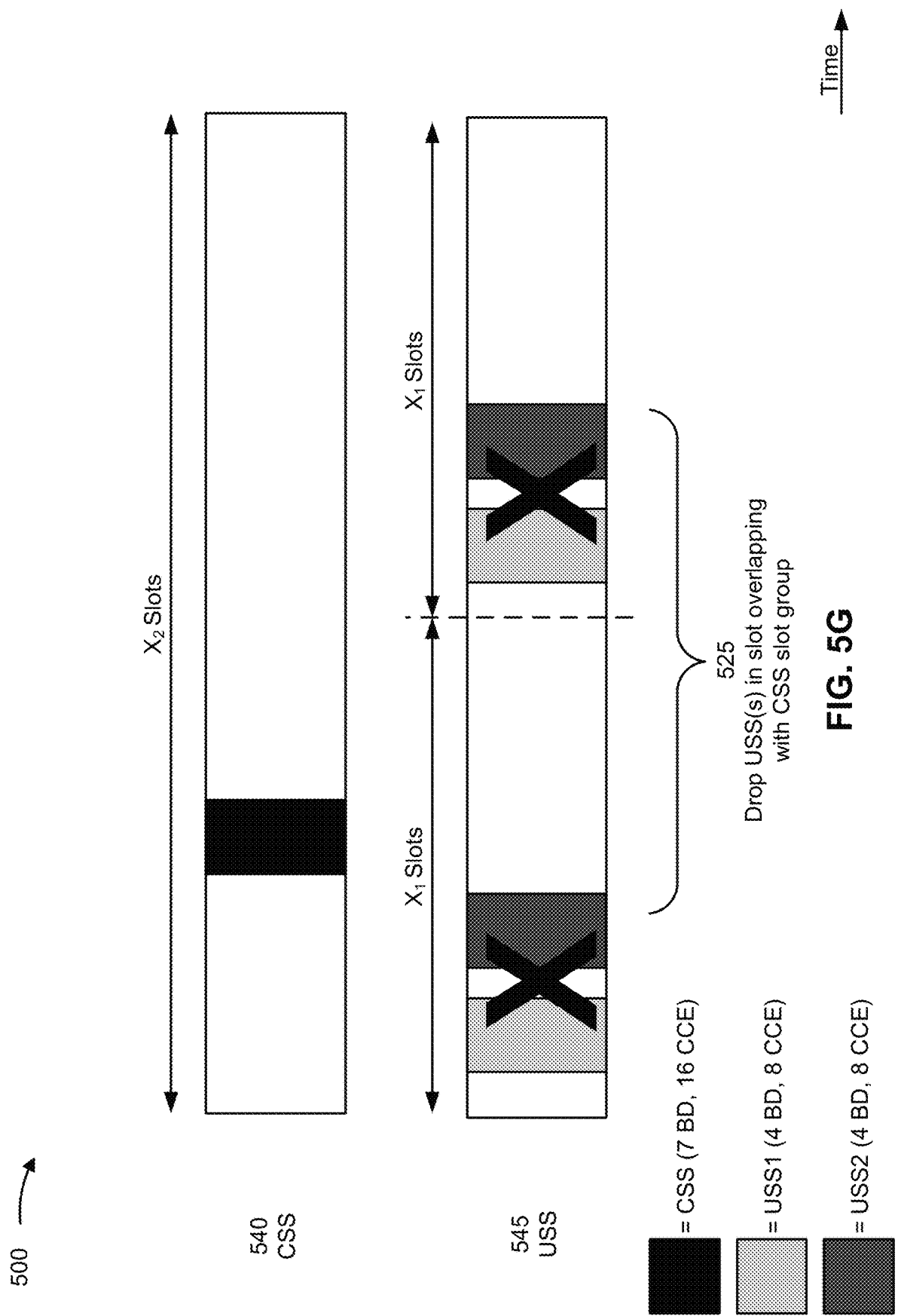

USER EQUIPMENT SPECIFIC SEARCH SPACE AND COMMON SEARCH SPACE ASSIGNMENT FOR MULTIPLE SLOT BASED CONTROL CHANNEL MONITORING

FIELD OF THE DISCLOSURE

Aspects of the present disclosure generally relate to wireless communication and to techniques and apparatuses for user equipment (UE) specific search space (USS) and common search space (CSS) assignment for multiple slot (multi-slot) based control channel monitoring.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a network entity, a search space configuration indicating a first configuration for a UE specific search space (USS) that is associated with a first slot group size and a second configuration for a common search space (CSS) that is associated with a second slot group size. The one or more processors may be configured to receive, from the network entity, a communication via a downlink control channel based at least in part on monitoring the downlink control channel in accordance with the search space configuration.

Some aspects described herein relate to a network entity for wireless communication. The network entity may include a memory and one or more processors coupled to the memory. The one or more processors may be configured to receive a capability report associated with a UE indicating at least one of a first supported first slot group size for USSs or a second supported slot group size for CSSs. The one or more processors may be configured to transmit a search space configuration for the UE indicating a first configuration for a USS that is associated with a first slot group size and a second configuration for a CSS that is associated with a second slot group size, wherein the search space configuration is based at least in part on the capability report.

Some aspects described herein relate to a method of wireless communication performed by a UE. The method may include receiving, from a network entity, a search space configuration indicating a first configuration for a USS that is associated with a first slot group size and a second configuration for a CSS that is associated with a second slot group size. The method may include receiving, from the network entity, a communication via a downlink control channel based at least in part on monitoring the downlink control channel in accordance with the search space configuration.

Some aspects described herein relate to a method of wireless communication performed by a network entity. The method may include receiving a capability report associated with a UE indicating at least one of a first supported first slot group size for USSs or a second supported slot group size for CSSs. The method may include transmitting a search space configuration for the UE indicating a first configuration for a USS that is associated with a first slot group size and a second configuration for a CSS that is associated with a second slot group size, wherein the search space configuration is based at least in part on the capability report.

Some aspects described herein relate to a non-transitory computer-readable medium that stores a set of instructions for wireless communication by a UE. The set of instructions, when executed by one or more processors of the UE, may cause the UE to receive, from a network entity, a search space configuration indicating a first configuration for a USS that is associated with a first slot group size and a second configuration for a CSS that is associated with a second slot group size. The set of instructions, when executed by one or more processors of the UE, may cause the UE to receive, from the network entity, a communication via a downlink control channel based at least in part on monitoring the downlink control channel in accordance with the search space configuration.

Some aspects described herein relate to a non-transitory computer-readable medium that stores a set of instructions for wireless communication by a network entity. The set of instructions, when executed by one or more processors of the network entity, may cause the network entity to receive a capability report associated with a UE indicating at least one of a first supported first slot group size for USSs or a second supported slot group size for CSSs. The set of instructions, when executed by one or more processors of the network entity, may cause the network entity to transmit a search space configuration for the UE indicating a first configuration for a USS that is associated with a first slot group size and a second configuration for a CSS that is associated with a second slot group size, wherein the search space configuration is based at least in part on the capability report.

Some aspects described herein relate to an apparatus for wireless communication. The apparatus may include means for receiving, from a network entity, a search space configuration indicating a first configuration for a USS that is associated with a first slot group size and a second configuration for a CSS that is associated with a second slot group size. The apparatus may include means for receiving, from the network entity, a communication via a downlink control channel based at least in part on monitoring the downlink control channel in accordance with the search space configuration.

Some aspects described herein relate to an apparatus for wireless communication. The apparatus may include means for receiving a capability report associated with a UE indicating at least one of a first supported first slot group size for USSs or a second supported slot group size for CSSs. The apparatus may include means for transmitting a search space configuration for the UE indicating a first configuration for a USS that is associated with a first slot group size and a second configuration for a CSS that is associated with a second slot group size, wherein the search space configuration is based at least in part on the capability report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5G are diagrams of an example associated with UE specific search space (USS) and common search space (CSS) assignment for multi-slot based control channel monitoring, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
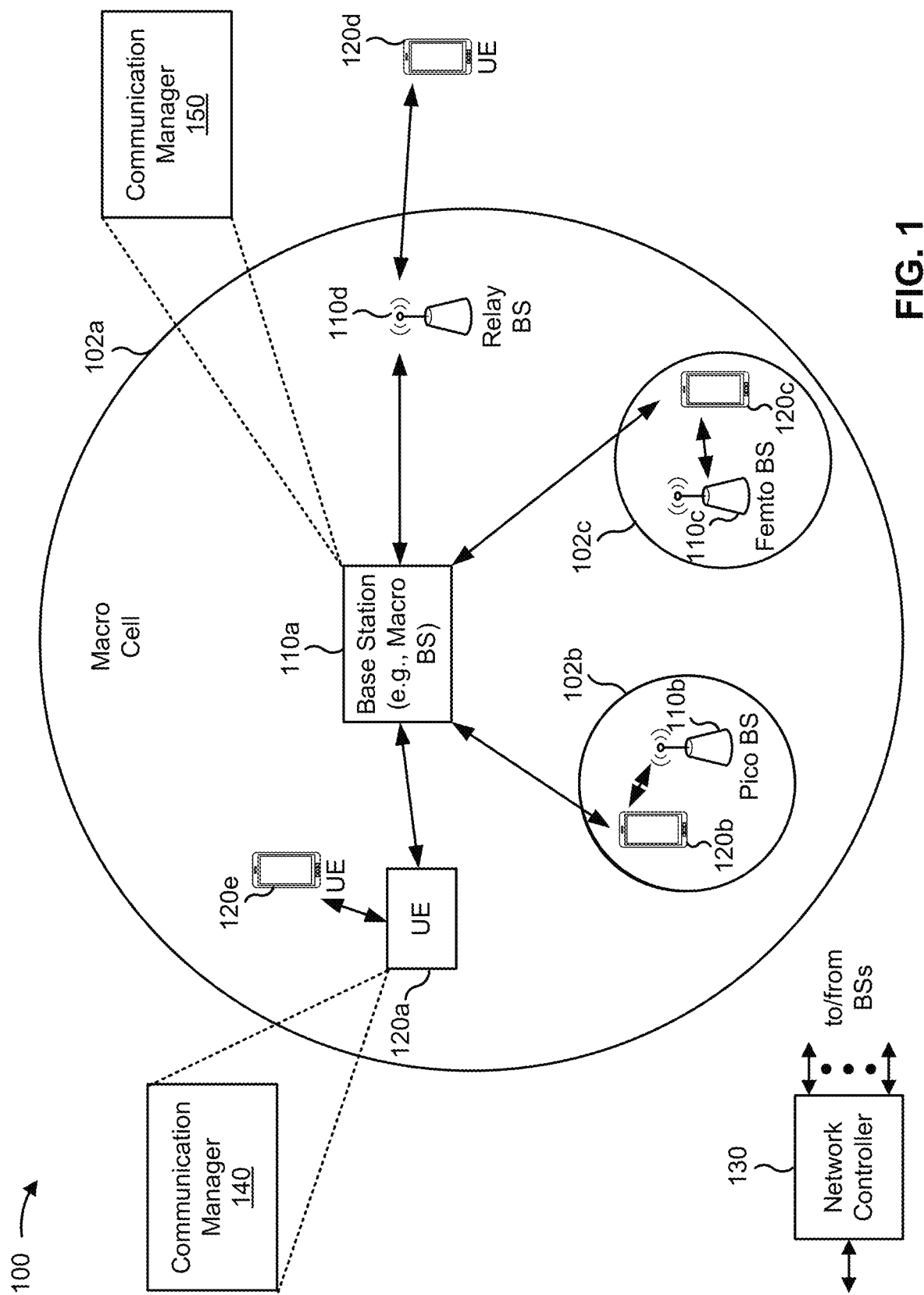
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (for example, the base station 110) or "network entity" may refer to an aggregated base station, a disaggregated base station, an integrated access and backhaul (IAB) node, a relay node, or one or more components thereof. For example, in some aspects, "base station" or "network entity" may refer to a central unit (CU), a distributed unit (DU), a radio unit (RU), a Near-Real Time (Near-RT) RAN Intelligent Controller (MC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, a search space configuration indicating a first configuration for a UE specific search space (USS) that is associated with a first slot group size and a second configuration for a common search space (CSS) that is associated with a second slot group size; and receive, from the network entity, a communication via a downlink control channel based at least in part on monitoring the downlink control channel in accordance with the search space configuration. Additionally, or alternatively, the communication manager 140 may perform one or more other operations described herein.

In some aspects, the network entity (e.g., shown in FIGS. 1 and 2 as a base station 110 as an example) may include a communication manager 150. As described in more detail elsewhere herein, the communication manager 150 may receive a capability report associated with a UE indicating at least one of a first supported first slot group size for USSs or a second supported slot group size for CSSs; and transmit a search space configuration for the UE indicating a first configuration for a USS that is associated with a first slot group size and a second configuration for a CSS that is associated with a second slot group size, wherein the search space configuration is based at least in part on the capability report. Additionally, or alternatively, the communication manager 150 may perform one or more other operations described herein.

As indicated above, FIG. 1 is provided as an example. Other examples may differ from what is described with regard to FIG. 1.

Figure 2:
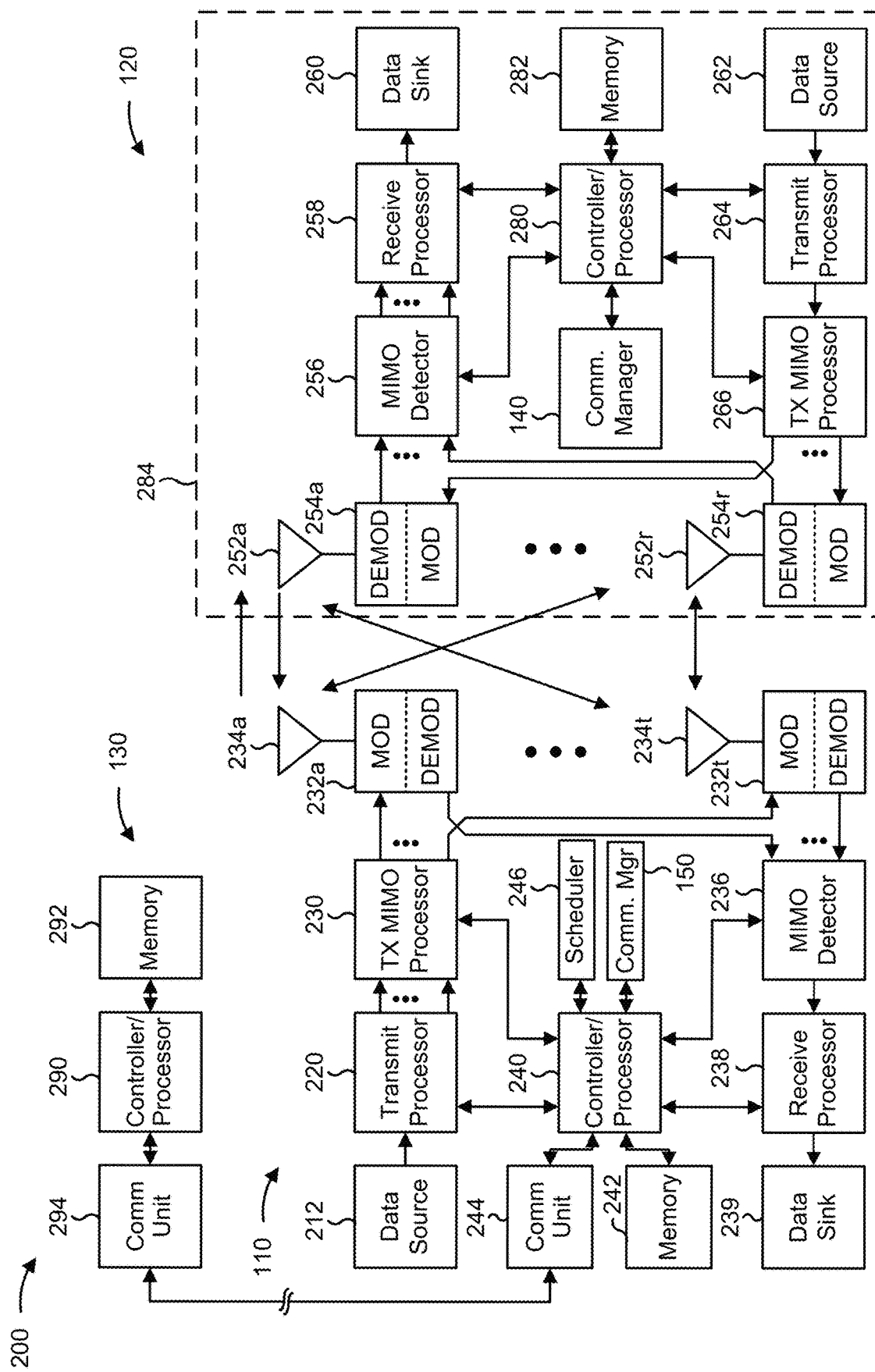
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-5G and 6-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-5G and 6-9).

The controller/processor 240 of the base station 110, the controller/processor 280 of the UE 120, and/or any other component(s) of FIG. 2 may perform one or more techniques associated with USS and CSS assignment for multiple slot based control channel monitoring, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving, from a network entity, a search space configuration indicating a first configuration for a USS that is associated with a first slot group size and a second configuration for a CSS that is associated with a second slot group size; and/or means for receiving, from the network entity, a communication via a downlink control channel based at least in part on monitoring the downlink control channel in accordance with the search space configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., shown in FIGS. 1 and 2 as a base station 110 as an example) includes means for receiving a capability report associated with a UE indicating at least one of a first supported first slot group size for USSs or a second supported slot group size for CSSs; and/or means for transmitting a search space configuration for the UE indicating a first configuration for a USS that is associated with a first slot group size and a second configuration for a CSS that is associated with a second slot group size, wherein the search space configuration is based at least in part on the capability report. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as a CU, one or more DUs, or one or more RUs). In some examples, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

For example, a disaggregated base station architecture may include a CU that can communicate directly with a core network via a backhaul link, or indirectly with the core network through one or more disaggregated control units (such as a Near-RT RIC via an E2 link, or a Non-RT RIC associated with a Service Management and Orchestration (SMO) Framework, or both). A CU may communicate with one or more DUs via respective midhaul links, such as through F1 interfaces. Each of the DUs may communicate with one or more RUs via respective fronthaul links. Each of the RUs may communicate with one or more UEs 120 via respective radio frequency (RF) access links. In some implementations, a UE 120 may be simultaneously served by multiple RUs.

Each of the units, including the CUs, the DUs, the RUs, as well as the Near-RT RICs, the Non-RT RICs, and the SMO Framework, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU may host one or more higher layer control functions. Such control functions can include RRC functions, packet data convergence protocol (PDCP) functions, or service data adaptation protocol (SDAP) functions, among other examples. Each DU may correspond to a logical unit that includes one or more base station functions to control the operation of one or more RUs. In some aspects, the DU may host one or more of a radio link control (RLC) layer, a MAC layer, and one or more high physical (PHY) layers depending, at least in part, on a functional split, such as a functional split defined by the 3GPP. Each RU may implement lower-layer functionality. In some deployments, an RU, controlled by a DU, may correspond to a logical node that hosts RF processing functions or low-PHY layer functions, such as performing an FFT, performing an iFFT, digital beamforming, or PRACH extraction and filtering, among other examples, based at least in part on a functional split (for example, a functional split defined by the 3GPP), such as a lower layer functional split. In such an architecture, each RU can be operated to handle over the air (OTA) communication with one or more UEs 120.

Figure 3:
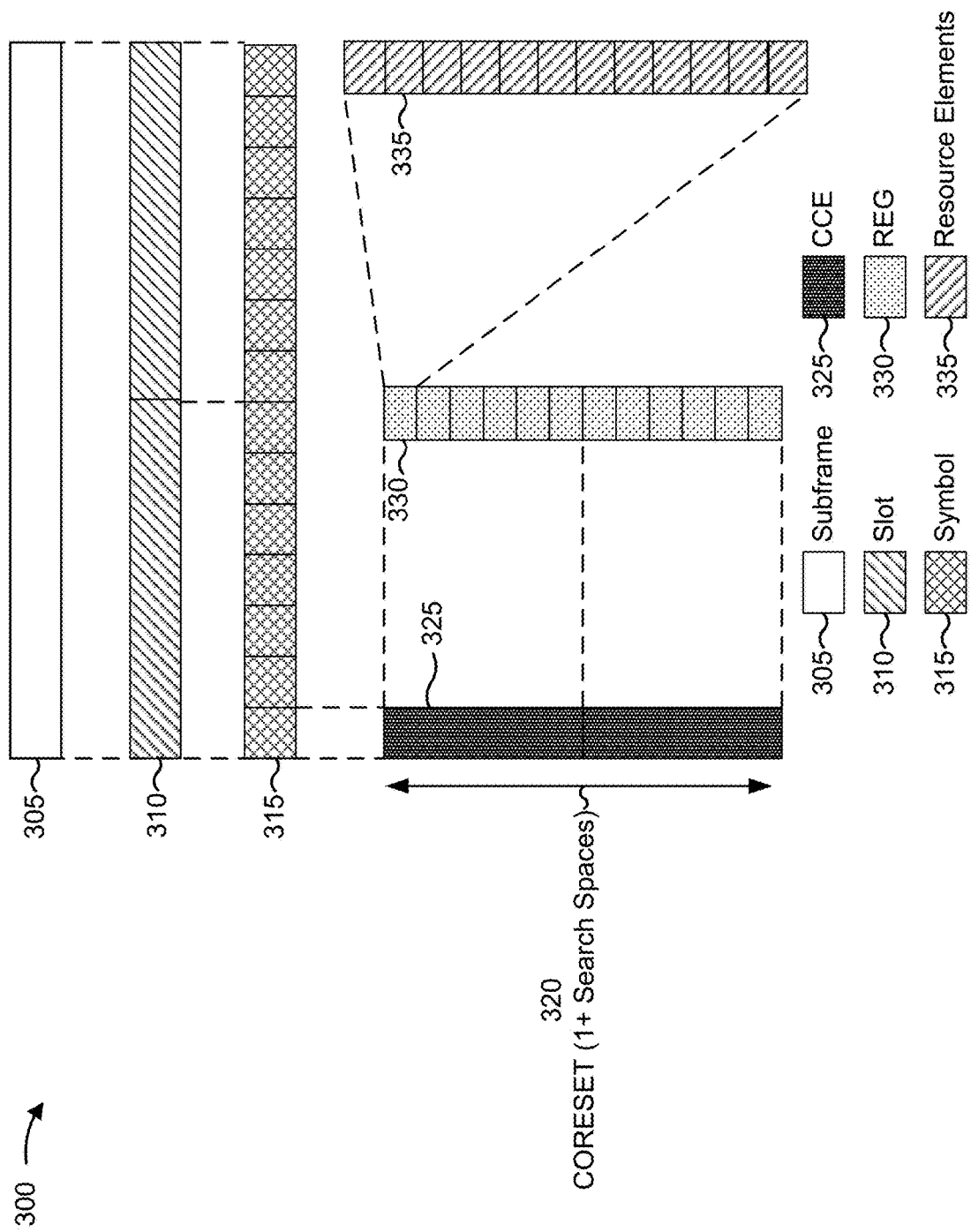
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more physical downlink control channels (PDCCHs) and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space (USS), a group-common search space, and/or a common search space (CSS). A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

In some RATs, such as 3GPP Release 15 of 5G/NR, different PDCCH monitoring capabilities are defined. As an example, a first feature group, which may be mandatory for Release 15 UEs to support, may indicate that the UE is capable of monitoring all PDCCH candidates, for scheduling data, that are within the first few symbols of a slot. As another example, a second feature group, which may be optional for Release 15 UEs to support, may be defined based at least in part on a span concept. A span is a number of consecutive symbols in a slot where the UE is configured to monitor the PDCCH. Each PDCCH monitoring occasion is within one span. A slot may include multiple spans, and a span may include one or more PDCCH candidates. Different span configurations may be supported.

In a 5G/NR network, a network entity may transmit a PDCCH communication (e.g., including control information, such as DCI) based at least in part on a search space set. A given search space set defines candidates that may carry a PDCCH communication within the search space set, where each candidate is associated with one or more CCEs. "Candidate" is used interchangeably herein with "PDCCH candidate." A CCE may be composed of multiple REGs. An REG may include one resource block and one OFDM symbol. One or more search space sets may be associated with a CORESET. In a 5G/NR network, a network entity may flexibly schedule and transmit a PDCCH communication. In other words, transmission of a PDCCH communication in the 5G/NR network is not limited to a particular set of frequency resources and/or time resources in a given radio frame, as in the case of, for example, an LTE network. PDCCH frequency domain and time domain resources are configured on a per CORESET basis. Thus, once a UE is configured with a CORESET, the UE has information that identifies which resource blocks in the frequency domain are assigned to a search space set associated with the CORESET, as well as information that identifies a number of consecutive symbols occupied by the search space set.

In order to receive a PDCCH communication associated with one or more candidates of a given UE-specific search space set (i.e., a search space set that may carry control information specific to one or more particular UEs), a UE may attempt to decode a PDCCH communication in candidates of the search space set. For example, the UE may determine one or more CCE indices associated with a candidate, and may attempt to decode the PDCCH communication (e.g., using a blind decoding procedure). A UE may signal, to the base station, a capability indicating how many non-overlapping CCEs and blind decodes (BDs) the UE is capable of handling. In some cases (e.g., 3GPP Release 15 of 5G/NR), limits on the number of non-overlapping CCEs and BDs are defined on a per-slot basis (e.g., a per-slot CCE/BD limit (also referred to as a per-slot capability). In some cases (e.g., 3GPP Release 16 of 5G/NR), limits on the number of non-overlapping CCEs and BDs are defined on a per-span basis (e.g., a per-span CCE/BD limit (also referred to as a per-span capability).

A PDCCH monitoring capability defined on a per-span basis may be referred to herein as a span-based monitoring capability or a Release 16 monitoring capability, whereas a PDCCH monitoring capability defined on a per-slot basis may be referred to as a slot-based monitoring capability or a Release 15 monitoring capability. In other words, slot-based monitoring is monitoring for which CCE/BD limits are defined per slot, whereas span-based monitoring is monitoring for which CCE/BD limits are defined per span.

A span configuration may be associated with a per-span capability for a number of BDs and/or a number of non-overlapped CCEs in a span. A per-span capability for a number of BDs may identify a maximum number of BDs that can be configured in a span, and a per-span capability for a number of non-overlapped CCEs may identify a maximum number of non-overlapped CCEs that can be configured in a span. These per-span capabilities may also be referred to as a BD limit and a CCE limit, respectively.

In some cases, a network entity may transmit, and a UE may receive, an indication of a PDCCH configuration. The PDCCH configuration may be associated with, or may be based at least in part on, a PDCCH BD limit or a PDCCH CCE limit. In some cases, the PDCCH configuration may configure a quantity of PDCCH candidates associated with the UE that results in a quantity of blind decodes or a quantity of CCEs that exceeds the PDCCH blind decode limit and the PDCCH CCE limit. This may be referred to herein as "overbooking." The UE may apply one or more overbooking rules or dropping rules in overbooking scenarios, such that a quantity of blind decodes does not exceed the PDCCH blind decode limit or a quantity of CCEs do not exceed the PDCCH CCE limit.

For example, the UE may determine to monitor PDCCH candidates associated with CSS sets (e.g., a search space set associated with a group of UEs). The UE may determine a quantity of blind decodes and/or CCEs corresponding to the PDCCH candidates associated with the CSS sets. The UE may subtract the quantity of blind decodes and/or CCEs from the PDCCH blind decode limit and/or the PDCCH CCE limit, respectively, to determine a remaining quantity of blind decodes and/or CCEs.

The UE may identify a USS set (e.g., a search set associated with only the UE) having a lowest index relative to other USS sets and may determine a quantity of blind decodes and/or CCEs corresponding to the PDCCH candidates associated with the identified USS set. The UE may determine whether the quantity of blind decodes and/or CCEs corresponding to the PDCCH candidates associated with the identified USS set is greater than, or equal to, the remaining quantity of blind decodes and/or CCEs. The UE may determine to monitor the PDCCH candidates associated with the identified USS set when the quantity of blind decodes and/or CCEs corresponding to the PDCCH candidates associated with the identified USS set is greater than, or equal to, the remaining quantity of blind decodes and/or CCEs. The UE may determine not to monitor the PDCCH candidates associated with the identified USS set or the PDCCH candidates associated with any remaining USS set when the quantity of blind decodes and/or CCEs corresponding to the PDCCH candidates associated with the identified USS set is less than the remaining quantity of blind decodes and/or CCEs. The UE may continue in a similar manner for each USS set.

In some aspects, a network entity may broadcast a synchronization signal block (SSB), which may include a primary synchronization signal (PSS) and a secondary synchronization signal (SSS) centralized within a physical broadcast channel (PBCH). Accordingly, the SSB may also be referred to as an SS/PBCH block.

Accordingly, a UE (e.g., UE 120) may detect the PSS and/or the SSS to determine a physical cell identifier (PCID) associated with the network entity and a timing associated with the PBCH. Accordingly, the UE 120 may decode the PBCH to obtain a master information block (MIB) message. The MIB message may include frequency and timing information to allow the UE 120 to establish a radio resource control (RRC) connection with a cell including the network entity, as well as including information for scheduling reception of remaining minimum system information (RMSI) by the UE 120. For example, the MIB message may include a pdcch-ConfigSIB1 data structure (e.g., as defined in 3GPP specifications and/or another standard) and/or another similar data structure defining a search space (e.g., in a physical downlink control channel (PDCCH) and/or the like) in which the UE 120 may receive scheduling information for the RMSI. This search space may be referred to as a Type0-PDCCH common search space (CSS).

In some aspects, the MIB message may include information associated with a control resource set (CORESET) configuration defining physical resources (e.g., one or more frequency resources, one or more time resources, and/or other resources) for monitoring the Type0-PDCCH CSS. Accordingly, this CORESET may be referred to as a Type0-PDCCH CORESET.

For other CSSs (e.g., a Type0A-PDCCH CSS associated with additional SIB messages, a Type1-PDCCH CSS associated with a random access response (RAR), and/or a Type2-PDCCH CSS associated with a paging occasion (PO)), the network entity may instruct the UE 120 to monitor a similar set of monitoring occasions that includes monitoring occasions in consecutive slots (e.g., by setting a SearchSpaceId for searchSpaceOtherSystemInformation, ra-SearchSpace, and/or pagingSearchSpace in PDCCH-ConfigCommon, as defined in 3GPP specifications and/or another standard, to zero). These other CSSs may similarly be associated with corresponding CORESET configurations defining physical resources for monitoring the CSSs (e.g., a Type0A-PDCCH CSS, a Type1-PDCCH CSS, and/or a Type2-PDCCH CSS, as described above). Accordingly, these corresponding CORESETs may be referred to as a Type0A-PDCCH CORESET, a Type1-PDCCH CORESET, or a Type2-PDCCH CORESET, respectively.

As indicated above, FIG. 3 is provided as an example. Other examples may differ from what is described with respect to FIG. 3.

Figure 4:
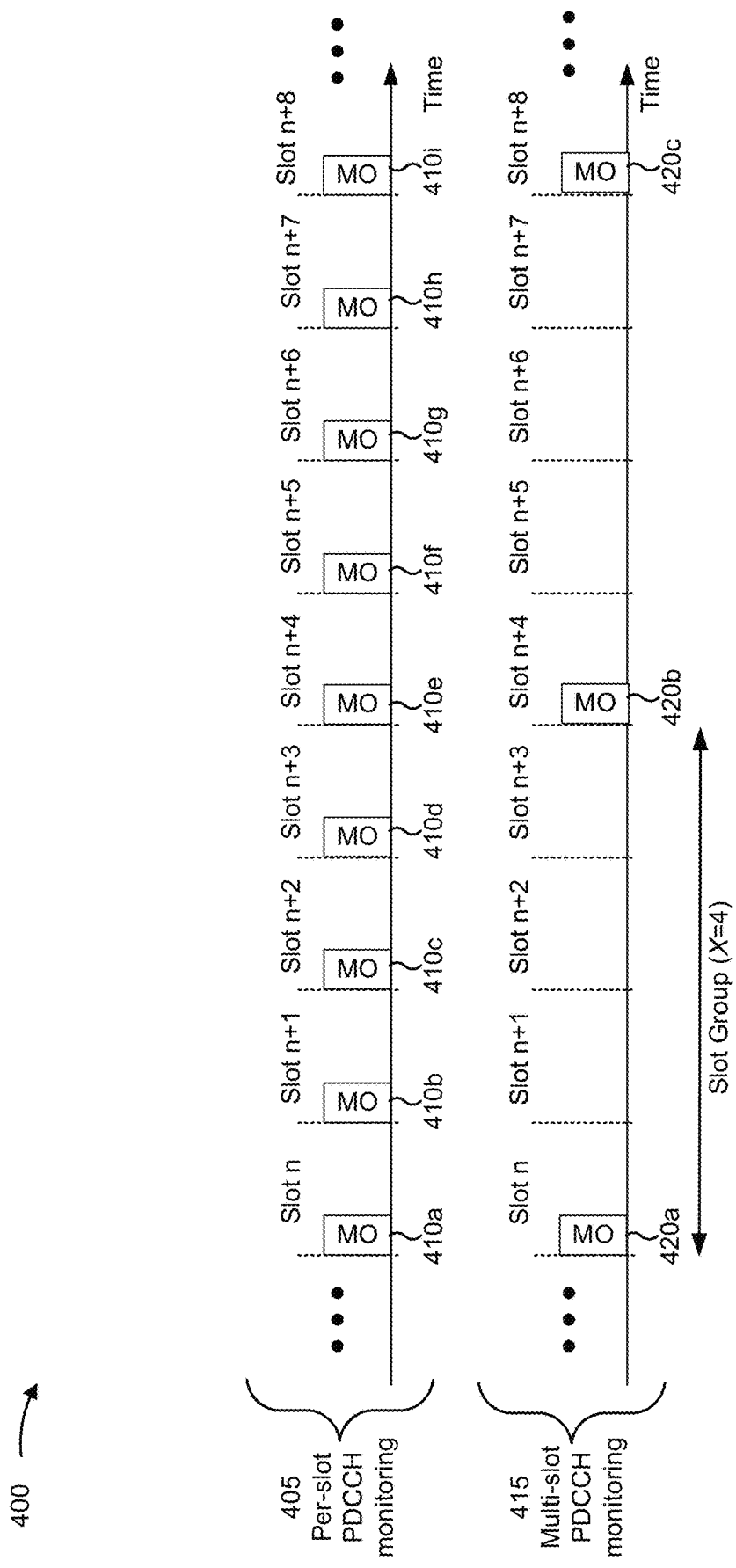
FIG. 4 is a diagram illustrating an example of multi-slot monitoring, in accordance with the present disclosure.

FIG. 4 is a diagram illustrating an example 400 of multi-slot monitoring, in accordance with the present disclosure. As shown in FIG. 4, a UE (e.g., UE 120) may monitor a set 405 of monitoring occasions (MOs) that are consecutive across slots (e.g., per-slot PDCCH monitoring). As used herein, "slot" may refer to a portion of a subframe, which in turn may be a fraction of a radio frame within an LTE, 5G, or other wireless communication structure. In some aspects, a slot may include one or more symbols. Additionally, "symbol" may refer to an OFDM symbol or another similar symbol within a slot. The set 405 of MOs may be associated with a search space set.

In example 400, the set 405 includes an MO 410*a* in slot n, where n represents an integer. Although shown at the beginning of slot n, MO 410*a* may be configured to include one or more symbols anywhere within slot n. The set 405 includes MOs that are consecutive across slots. Accordingly, in the set 405, MO 410*b* is in slot n+1. These consecutive MOs may repeat in time. In example 400, this repetition is in every slot such that MO 410*c* is in slot n+2, MO 410*d* is in slot n+4, MO 410*e* is in slot n+4, MO 410*f* is in slot n+5, MO 410*g* is in slot n+6, MO 410*h* is in slot n+7, MO 410*i* is in slot n+8, and so on. Although the consecutive MOs repeat every slot in example 400, the consecutive MOs may repeat in every other slot (e.g., with MO 410*c* in slot n+3 and MO 410*d* in slot n+4, and so on), in every third slot (e.g., with MO 410*c* in slot n+4 and MO 410*d* in slot n+5, and so on), or according to larger periods.

In higher frequencies (e.g., between 52.6 GHz and 114.25 GHz), phase noise may increase. Accordingly, to reduce the impact of phase noise, a wireless network may employ larger subcarrier spacings (SCSs). As used herein, "subcarrier spacing" or "SCS" may refer to a range of frequencies (or an amount of bandwidth) between subcarriers used on a cell of the wireless network. For example, a cell configured for FR2 may use an SCS between 60 kHz and 120 kHz while a cell configured for higher frequencies may use an SCS between 240 kHz and 1.92 MHz. Larger SCS results in slots with a shorter duration. For example, a slot in FR2 with 120 kHz SCS may be approximately 125 µs in length while a slot in higher frequencies with 960 kHz SCS may be approximately 15.6 µs in length.

In some cases, the processing timeline of a UE 120 (e.g., for control and data processing) may not proportionally scale with the slot length. For example, a UE 120 using lower frequency ranges (e.g., FR1/FR2) may enjoy the power saving benefits of micro-sleep. However, for a UE 120 using higher frequency ranges (e.g., FR4), control channel processing may be comparable to, or may even overrun, the slot length. Therefore, micro-sleep may not be possible. In another example, a UE 120 using FR1/FR2 may be configured to monitor the PDCCH in every slot. However, in FR4 (e.g., due to the limited processing capability), the minimum PDCCH monitoring periodicity may be greater than a single slot. Thus, performing PDCCH monitoring in each slot may not be possible.

In some cases, a UE 120 may be configured to perform micro-sleeping either with cross-slot scheduling or without cross-slot scheduling. In a first example, the UE 120 may perform PDCCH monitoring in the first three symbols of the slot, and the UE 120 may perform micro-sleeping with cross slot scheduling in the remaining 11 symbols. In a second example, the PDCCH monitoring and processing time may require half (or more) of the slot time. Thus, the micro-sleeping without the cross-slot scheduling may be less than half of the slot length.

In some cases, the UE 120 may be configured to perform multi-slot PDCCH monitoring. For example, the UE 120 may be configured to monitor the PDCCH every other slot, or every few slots, instead of at every individual slot. Accordingly, as further shown in FIG. 4, because the slot is shorter in duration, the UE 120 may monitor a set 415 of MOs that are non-consecutive across slots (e.g., multi-slot PDCCH monitoring). The set 415 of MOs may be associated with a CSS. In example 400, the set 415 includes an MO 420*a* in slot n, where n represents an integer. Although shown at the beginning of slot n, MO 420*a* may be configured to include one or more symbols anywhere within slot n. The set 415 includes MOs that are non-consecutive across slots. Accordingly, in the set 415, MO 420*b* is in slot n+4, MO 420*c* is in slot n+8, and so on. Although the non-consecutive MOs repeat every third slot in example 400, the consecutive MOs may repeat in every other slot (e.g., with MO 420*b* in slot n+2, MO 420*c* in slot n+4, and so on), in every eighth slot (e.g., with MO 420*b* in slot n+8, MO 420*c* in slot n+16, and so on), or according to larger periods.

Multi-slot PDCCH monitoring may be supported by a UE for certain SCSs, such as for an SCS of 480 kHz or 960 kHz, among other examples. In some cases, the UE may be associated with a capability for multi-slot PDCCH monitoring. The capability may be represented by two values (X, Y), where X is a quantity of slots included in a slot group for multi-slot PDCCH monitoring and Y is a quantity of consecutive slots, within a given slot group, in which the PDCCH can be monitored by the UE. As used herein, "slot group" may refer to two or more slots (for example, the set 415 may be associated with a slot group size of 4 (e.g., a value of X of 4)). The supported value(s) of X may be based at least in part on one or more capabilities of the UE 120, and a network entity may configure one or more PDCCH search spaces for the UE 120 based at least in part on the UE 120 capability reporting. In some cases, the variable Y may be used to represent a monitoring span. The monitoring span may correspond to a number of consecutive slots where monitoring occasions reside within a slot group. The monitoring occasions may be confined within the monitoring span of the slot group. For example, a monitoring span having one slot may have a value of Y=1, and a monitoring span having three consecutive slots may have a value of Y=3.

In some cases, for a Group (1) search space (SS) (e.g., Type 1 common search space (CSS) with dedicated RRC configuration and Type 3 CSS, UE-specific SS), one or more of the following may be supported: the SS may be monitored within Y consecutive slots within a slot group of X slots; the Y consecutive slots can be located anywhere within the slot group of X slots; the location of the Y consecutive slots within the slot group of X slots may be maintained across different slot groups; and blind decoding (BD) attempts for all Group (1) SSs may be restricted to fall within the same Y consecutive slots.

In some cases, for a Group (2) SS (e.g., Type 1 CSS without dedicated RRC configuration and type 0, 0A, and 2 CSS), SS monitoring locations may be anywhere within a slot group of X slots (with possible exceptions).

In some cases, the supported combinations of (X, Y) may be as follows. A UE 120 capable of multi-slot monitoring may (e.g., mandatorily) support: for SCS 480 kHz: (X, Y)=(4,1); and for SCS 960 kHz: (X, Y)=(8,1). A UE 120 capable of multi-slot monitoring may (e.g., optionally) support: for SCS 480 kHz: (X, Y)=(4,2); and for SCS 960 kHz: (X, Y)=(8,4), (4,2), (4,1).

PDCCH candidate limits, BD limits, and/or CCE limits may be defined (e.g., by a wireless communication standard, such as the 3GPP) for different supported multi-slot PDCCH monitoring capabilities. For example, for SCS 480 kHz and (X, Y)=(4,1), a maximum number of monitored PDCCH candidates in a slot group may be 20 and a maximum number of non-overlapped CCEs in a slot group may be 32. As another example, for SCS 960 kHz and (X, Y)=(4,2), a maximum number of monitored PDCCH candidates in a slot group may be 10 and a maximum number of non-overlapped CCEs in a slot group may be 16. As another example, for SCS 960 kHz and (X, Y)=(8,1), a maximum number of monitored PDCCH candidates in a slot group may be 20 and a maximum number of non-overlapped CCEs in a slot group may be 32.

For smaller slot group sizes (e.g., X=4), a UE may have a strict or small BD limit and/or CC limit. For example, for SCS 960 kHz and (X, Y)=(4,1) and (4,2), a maximum number of monitored PDCCH candidates in a slot group may be 10 and a maximum number of non-overlapped CCEs in a slot group may be 16. In some cases, for a CSS set, up to 7 PDCCH candidates and 28 CCEs may be configured (e.g., as defined, or otherwise fixed, by a wireless communication standard, such as by 3GPP Technical Specification 38.213 Version 17.0.0). Therefore, for smaller slot group sizes (e.g., X=4), due to the limited BD/CCE budget, a maximum aggregation level for a CSS may be limited to be less than or equal to 16. As a result, broadcast or common PDCCH performance may be degraded. Additionally, after assigning PDCCH candidates, BDs, or CCEs for CSS sets, there may be very few PDCCH candidates, BDs, or CCEs available to be assigned to USS sets (e.g., due to the limited BD/CCE budget associated with smaller slot group sizes). As a result, unicast PDCCH performance and flexibility may be degraded.

Some techniques and apparatuses described herein enable USS and CSS assignment for multi-slot based control channel (e.g., PDCCH) monitoring. For example, the multi-slot based PDCCH monitoring may be associated with different slot group sizes for CSS sets and USS sets. For example, a UE may receive a search space configuration indicating a first configuration for a USS that is associated with a first slot group size (e.g., $X_1$) and a second configuration for a CSS that is associated with a second slot group size (e.g., $X_2$). The UE may receive a communication via a downlink control channel (e.g., the PDCCH) based at least in part on monitoring the downlink control channel in accordance with the search space configuration. In some aspects, PDCCH candidate and/or CCE assignments and overbooking rules may be defined for scenarios in which the UE is configured with CSS set(s) and USS set(s) having different slot group sizes.

As a result, downlink control channel monitoring and/or communications may be improved. For example, using different slot group sizes for CSS sets and USS sets may improve a flexibility for PDCCH candidate and/or CCE assignment. For example, a CSS may be associated with a first slot group size (e.g., that is associated with a first PDCCH limit, first BD limit, and/or first CCE limit). A USS may be associated with a second slot group size (e.g., that is associated with a second PDCCH limit, second BD limit, and/or second CCE limit). In some aspects, the first slot group size may be larger than the second slot group slot. Therefore, the UE may be enabled to assign more PDCCH candidates and/or CCEs for the CSS (e.g., over the larger slot group size that is associated with a larger PDCCH limit, BD limit, and/or CCE limit) (e.g., because the CSS may be associated with more PDCCH candidates and/or CCEs than a USS). The UE may be enabled to assign PDCCH candidates and/or CCEs for the USS over the smaller slot group size (e.g., based at least in part on a remaining PDCCH candidate or CCE budget after allocating resources for the CSS set(s)) to conserve resources and/or ensure that the UE is enabled to enter a sleep state or micro-sleep state. Therefore, the search space configuration that is associated with different slot group sizes for CSS sets and USS sets may improve a flexibility for PDCCH candidate and/or CCE assignment.

Figure 5A:
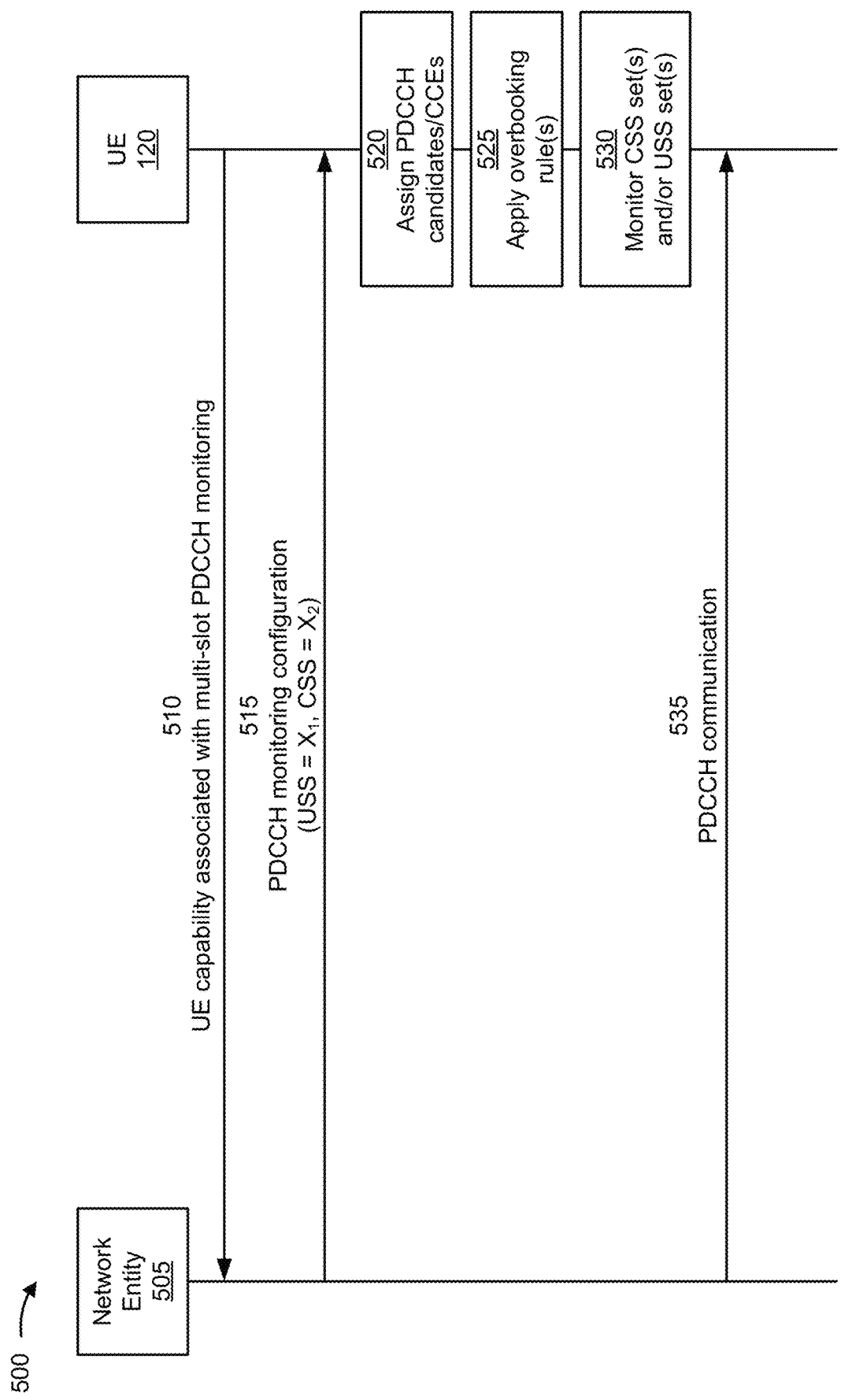

FIGS. 5A-5G are diagrams of an example 500 associated with USS and CSS assignment for multi-slot based control channel monitoring, in accordance with the present disclosure. As shown in FIG. 5A, a network entity 505 (e.g., a base station 110, a CU, a DU, and/or an RU) may communicate with a UE (e.g., a UE 120). In some aspects, the network entity 505 and the UE 120 may be part of a wireless network (e.g., the wireless network 100). In some aspects, the UE 120 and the network entity 505 may have established a wireless connection prior to operations shown in FIGS. 5A-5G.

In some aspects, the network entity 505 may transmit, and the UE 120 may receive, configuration information. In some aspects, the UE 120 may receive the configuration information via one or more of radio resource control (RRC) signaling, one or more medium access control (MAC) control elements (MAC-CEs), and/or downlink control information (DCI), among other examples. In some aspects, the configuration information may include an indication of one or more configuration parameters (e.g., already stored by the UE 120 and/or previously indicated by the network entity 505 or another network device) for selection by the UE 120, and/or explicit configuration information for the UE 120 to use to configure itself, among other examples.

In some aspects, the configuration information may indicate that the UE 120 is to monitor a downlink control channel (e.g., a PDCCH) using multi-slot PDCCH monitoring. In some aspects, the configuration information may indicate that the UE 120 is to monitor the downlink control channel using one or more CSS sets and one or more USS sets, where the CSS sets are associated with a first slot group size and the USS sets are associated with a second slot group size. In some aspects, the configuration information may indicate that the UE 120 is to report a capability associated with multi-slot PDCCH monitoring. In some aspects, the configuration information may indicate that the UE 120 is to report a capability associated with PDCCH monitoring using different slot group sizes for CSS sets and USS sets.

The UE 120 may configure itself based at least in part on the configuration information. In some aspects, the UE 120 may be configured to perform one or more operations described herein based at least in part on the configuration information.

As shown by reference number 510, the UE 120 may transmit a capability report (e.g., to the network entity 505 or to another network entity). The network entity 505 may receive the capability report (e.g., from the UE 120 or from another network entity). In some aspects, the capability report may indicate UE support for multi-slot downlink control channel monitoring. In some aspects, the capability report may indicate that the UE 120 supports being configured with CSS set(s) and USS set(s) having different slot group sizes.

For example, the UE 120 may transmit the capability report indicating at least one of a first supported first slot group size for USSs and/or a second supported slot group size for CSSs. In some aspects, the UE 120 may report different capabilities for CSSs and USSs. For example, the UE 120 may transmit an indication of a first PDCCH monitoring capability of (X, Y) associated with multi-slot PDCCH monitoring of USSs. The UE 120 may transmit an indication of a second PDCCH monitoring capability of (X, Y) associated with multi-slot PDCCH monitoring of CSSs. In some other aspects, the UE 120 may transmit an indication of a single capability (e.g., of (X, Y)), where the UE 120 may be expected to support any configuration of ($X_3$, $Y_3$) for CSSs and/or USSs, so long as $X_3 \geq X$ and $Y_3 \leq Y$. For example, for capabilities of (X, Y) and ($X_3$, $Y_3$), a PDCCH candidate limit, a BD limit, and/or a CCE limit associated with ($X_3$, $Y_3$) may be larger than or equal to limit(s) associated with (X, Y) when $X_3 \geq X$.

The UE 120 may transmit the capability report via an uplink control channel communication (e.g., a physical uplink control channel (PUCCH) communication), an uplink data channel or shared channel communication (e.g., a physical uplink shared channel (PUSCH) communication), UE capability signaling, a UE assistance information (UAI) communication, or another type of communication or signaling. The network entity 505 may receive the capability report and may determine a downlink control channel monitoring configuration for the UE 120 based at least in part on the capability report (e.g., as described in more detail elsewhere herein).

As shown by reference number 515, the UE 120 may receive (e.g., from the network entity 505 or from another network entity) a search space configuration indicating a first configuration for a USS that is associated with a first slot group size (e.g., $X_1$) and a second configuration for a CSS that is associated with a second slot group size (e.g., $X_2$). The network entity 505 may transmit the search space configuration (e.g., to the UE 120 or to another network entity). The search space configuration may be included in, or associated with, a PDCCH configuration (e.g., a pdcch-Config). In some aspects, the UE 120 may receive the search space configuration via one or more of RRC signaling, one or more MAC-CEs, and/or DCI, among other examples. In some aspects, the search space configuration may include an indication of one or more configuration parameters (e.g., already stored by the UE 120 and/or previously indicated by the network entity 505 or another network device) for selection by the UE 120, and/or explicit configuration information for the UE 120 to use to configure itself, among other examples.

The first configuration for the USS may indicate one or more USS sets associated with multi-slot PDCCH monitoring using a slot group size of $X_1$. A USS set may indicate a set of frequency domain resources and/or time domain resources (e.g., one or more PDCCH candidates, one or more BDs, and/or one or more CCEs) that are to be monitored by the UE 120 for receiving PDCCH communications (e.g., unicast PDCCH communications). For example, a USS set may be associated with one or more monitoring occasions (MOs) within a quantity of $X_1$ slots. The second configuration for the CSS may indicate one or more CSS sets associated with multi-slot PDCCH monitoring using a slot group size of $X_2$. A CSS set may indicate a set of frequency domain resources and/or time domain resources (e.g., one or more PDCCH candidates, one or more BDs, and/or one or more CCEs) that are to be monitored by the UE 120 for receiving PDCCH communications (e.g., common or broadcast PDCCH communications). For example, a CSS set may be associated with one or more MOs within a quantity of $X_2$ slots.

The network entity 505 may determine the search space configuration. In some aspects, the network entity 505 may determine the search space configuration based at least in part on a capability of the UE 120 (e.g., an (X, Y) capability and/or another capability), such as the one or more capabilities indicated via the capability report. In some aspects, the network entity 505 may configure the UE 120 with CSS set(s) and USS set(s) having different slot group sizes based at least in part on the UE 120 indicating that the UE 120 supports being configured with CSS set(s) and USS set(s) having different slot group sizes (e.g., in the capability report).

In some aspects, the network entity 505 may determine a value of $X_1$ and/or $X_2$ based at least in part on a capability of the UE 120 (e.g., an (X, Y) capability and/or another capability). In some aspects, the network entity 505 may determine a value of $X_1$ (e.g., for USSs) based at least in part on the capability of the UE 120 and may determine a value of $X_2$ (e.g., for CSSs) based at least in part on a threshold that is common for multiple (e.g., all) UEs communicating with the network entity 505. For example, in some cases, the threshold (e.g., a limit for a CSS slot group size) may be defined, or otherwise fixed, by a wireless communication standard, such as the 3GPP (e.g., and may be stored in a memory of the network entity 505 and/or the UE 120, such as part of an original equipment manufacturer (OEM) configuration). As another example, the network entity 505 may determine the threshold and may transmit an indication of the threshold. For example, the network entity 505 may transmit an indication of a limit for a CSS slot group size in a broadcast communication, a system information communication (e.g., in a system information block (SIB) or a master information block (MIB)), and/or an RRC communication, among other examples.

In some aspects, the UE 120 may receive an indication of the first slot group size $X_1$ and/or the second slot group size $X_2$. In some aspects, the indication of the first slot group size $X_1$ and/or the second slot group size $X_2$ may be included in the search space configuration (e.g., in an RRC communication). As another example, the indication of the first slot group size $X_1$ and/or the second slot group size $X_2$ may be included in a system information communication (e.g., in an SIB or an MIB). For example, the search space configuration may indicate a value of $X_1$ and a system information communication or another RRC communication may indicate a value of $X_2$. As another example, the search space configuration may indicate a value of $X_1$ and a value of $X_2$ may be stored by the UE 120, such as in an OEM configuration (e.g., when the value of $X_2$ is defined, or otherwise fixed, by a wireless communication standard, such as the 3GPP). In other words, the value of $X_1$ (e.g., for USSs) may be specific to the UE 120 and selected by the network entity based at least in part on the capability (e.g., the (X, Y) capability and/or another capability) of the UE 120. The value of $X_2$ may be common to multiple UEs, may be a predetermined value hard-coded in a memory of the UE 120 or network entity 505, and/or may be indicated by network entity 505 via system information or RRC signaling, among other examples.

In some aspects, a first blind decoding limit (e.g., a first PDCCH candidate limit) and/or a first CCE limit associated with monitoring the downlink control channel via the USS may be based at least in part on the first slot group size $X_1$. A second blind decoding limit (e.g., a second PDCCH candidate limit) and/or a second CCE limit associated with monitoring the downlink control channel via the CSS may be based at least in part on the second slot group size $X_2$. In other words, a time unit for applying PDCCH overbooking and/or dropping rules may be different for the USS and the CSS.

In some aspects, the first slot group size may be smaller than or equal to the second slot group size (e.g., $X_1<X_2$). By enabling a configured value of $X_2$ to be greater than a configured value of $X_1$, flexibility for assigning PDCCH candidates and/or CCEs for CSS monitoring may be improved. For example, previously, if the UE 120 supported only a small slot group size (e.g., such as X=4), CSS monitoring and/or communication performance may be degraded due to the strict PDCCH candidate limit and/or CCE limit associated with the small slot group size. By enabling a configured value of $X_2$ to be greater than a configured value of $X_1$, a PDCCH candidate limit and/or CCE limit associated with CSSs may be relaxed while also configuring the USS with the smaller slot group size.

In some aspects, the second slot group size may be an integer multiple of the first slot group size. For example, $X_2$ may be $K \cdot X_1$, where K is an integer greater than or equal to one (1). This may reduce a complexity associated with applying PDCCH monitoring overbooking and/or dropping rules between USS set(s) and CSS set(s) having different slot group sizes, as explained in more detail elsewhere herein.

The UE 120 may configure itself based at least in part on the search space configuration. In some aspects, the UE 120 may be configured to perform one or more operations described herein based at least in part on the search space configuration.

Figure 5B:
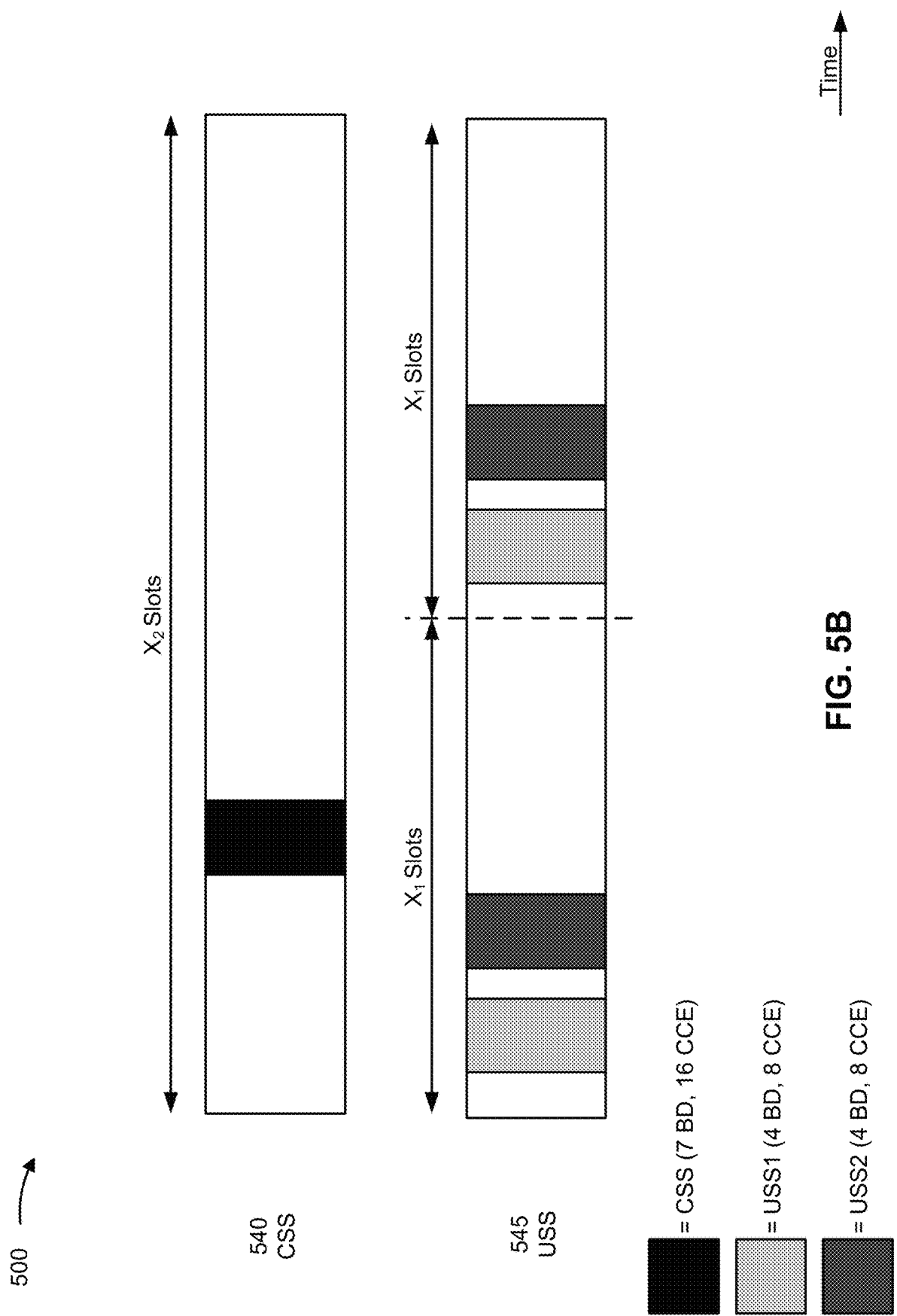

As shown in FIG. 5B, an example of the configured CSS (e.g., a CSS 540 and a USS 545) is depicted (e.g., as configured by the search space configuration). As a shown, the CSS 540 may be associated with the slot group size $X_2$ and the USS 545 may be associated with the slot group size $X_1$. For example, $X_2$ may be eight and $X_1$ may be four. As shown in FIG. 5B as an example, the CSS 540 may be associated with a single CSS set. The CSS set may be associated with an MO within the $X_2$ slots having seven BDs (e.g., seven PDCCH candidates) and sixteen CCEs. The USS 545 may be associated with a first USS set (USS1) and a second USS set (USS2). For example, in a first $X_1$ slots, the UE 120 may be configured to monitor the first USS set and the second USS set. In a second $X_1$ slots, the UE 120 may be configured to monitor the first USS set and the second USS set. The first USS set may be associated with four BDs (e.g., four PDCCH candidates) and eight CCEs. The second USS set may be associated with four BDs (e.g., four PDCCH candidates) and eight CCEs. As described above, the value $X_2$ (e.g., eight) may be associated with a first BD limit (e.g., a first PDCCH candidate limit) and a first CCE limit. For example, for a value of eight, the UE 120 may be limited to configuring twenty PDCCH candidates (e.g., twenty BDs) and thirty-two CCEs over a given eight consecutive slots. The value $X_1$ (e.g., four) may be associated with a second BD limit (e.g., a second PDCCH candidate limit) and a second CCE limit. For example, for a value of four, the UE 120 may be limited to configuring ten PDCCH candidates (e.g., ten BDs) and sixteen CCEs over a given eight consecutive slots.

Returning to FIG. 5A, as shown by reference number 520, the UE 120 and/or the network entity 505 may assign or allocate PDCCH candidates and/or CCEs to the CSS and the USS (e.g., the CSS 540 and the USS 545). In some aspects, the UE 120 may allocate PDCCH candidates (e.g., blind decodings) and/or CCEs first to the CSS and second to the USS. For example, the UE 120 may allocate blind decodings (e.g., PDCCH candidates) and/or CCEs for the CSS, over a first quantity of slots indicated by the second slot group size (e.g., over $X_2$ slots), based at least in part on a first blind decoding limit or a first CCE limit that is based at least in part on the second slot group size, to obtain a remaining blind decoding or CCE budget. The UE 120 may allocate blind decodings (e.g., PDCCH candidates) and/or CCEs for the USS, over the first quantity of slots indicated by the second slot group size, based at least in part on the remaining blind decoding or CCE budget.

For example, using the example search space configuration shown in FIG. 5B, the UE 120 may be associated with a PDCCH candidate limit (e.g., a BD limit) of twenty and a CCE limit of thirty-two over the $X_2$ slots. The UE 120 may be configured with the CSS having seven BDs (e.g., seven PDCCH candidates) and sixteen CCEs. Therefore, after allocating the seven PDCCH candidates for the CSS, the remaining blind decoding budget (e.g., remaining PDCCH budget) over the $X_2$ slots may be thirteen (e.g., 20−7=13). Similarly, after allocating the sixteen CCEs for the CSS, the remaining CCE budget over the $X_2$ slots may be sixteen (e.g., 32−16=16). Therefore, the UE 120 may have thirteen PDCCH candidates (e.g., thirteen BDs) and sixteen CCEs available to be allocated to the USS set(s) over the $X_2$ slots.

In some aspects, as shown by reference number 525, the UE 120 may apply overbooking and/or dropping rules for the USS (e.g., if the configured quantity of PDCCH candidates and/or CCEs over the $X_2$ slots for the USS is greater than the remaining blind decoding or CCE budget after allocating resources to the CSS). In some aspects, the network entity 505 may identify USS sets or MOs that are dropped (e.g., not monitored) by the UE 120 in a similar manner as described in more detail elsewhere herein. As shown in FIG. 5B, the UE 120 may be configured with the first USS set having four BDs (e.g., four PDCCH candidates) and eight CCEs and the second USS set having four BDs (e.g., four PDCCH candidates) and eight CCEs. This results in the UE 120 being configured with sixteen PDCCH candidates (e.g., eight in the first $X_1$ slots and eight in the second $X_1$ slots) and thirty-two CCEs (e.g., sixteen in the first $X_1$ slots and sixteen in the second $X_1$ slots) over the $X_2$ slots. Because the sixteen PDCCH candidates is greater than the remaining PDCCH candidate budget (e.g., of thirteen, as described above) and/or because the thirty-two CCEs is greater than the remaining CCE budget (e.g., of sixteen, as described above), the UE 120 may apply one or more overbooking and/or dropping rules. In some aspects, the one or more overbooking and/or dropping rules may be defined, or otherwise fixed, by a wireless communication standard, such as the 3GPP. In some aspects, the one or more overbooking and/or dropping rules may be indicated to the UE 120 (e.g., by the network entity 505, in the search space configuration, in a system information communication, and/or in another communication).

In some aspects, the one or more overbooking rules and/or one or more dropping rules may assume a time unit of $X_2$ slots. For example, for slot groups of $X_1$ slots overlapping with the slot group of $X_2$ slots for the CSS, the overbooking and dropping rule(s) may assume a time unit of $X_2$ slots (e.g., for each slot group of $X_1$ slots). In other words, the UE 120 may allocate the blind decodings or CCEs for the USS, over a second quantity of slots indicated by the first slot group size (e.g., over $X_1$ slots), based at least in part on a blind decoding limit or a CCE limit that is based at least in part on the first slot group size (e.g., $X_2$), assuming that $X_2$ is greater than or equal to $X_1$.

Figure 5C:
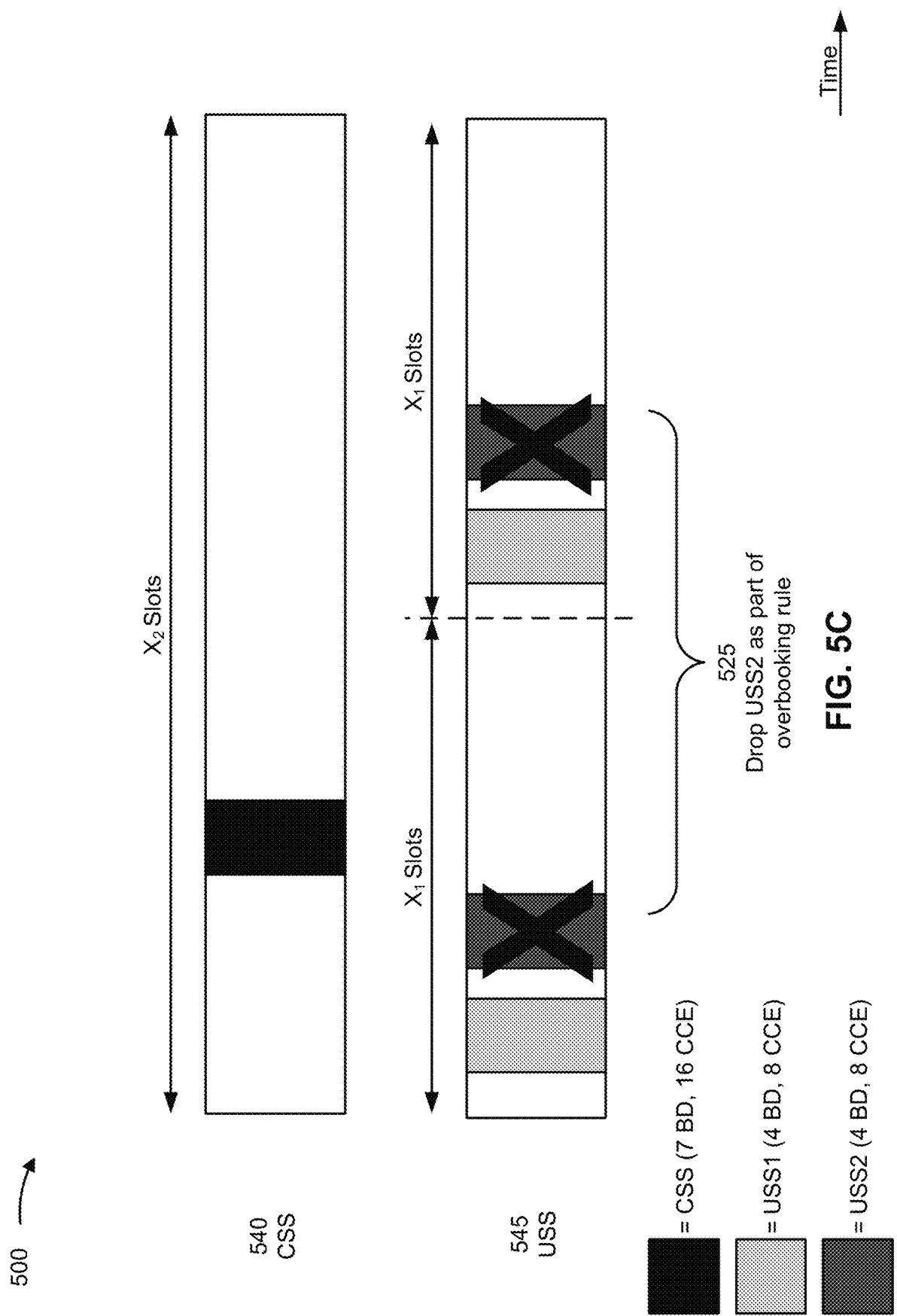

As shown in FIG. 5C, the overbooking and/or dropping rules may indicate that the UE 120 is to drop (e.g., refrain from monitoring) one or more USS sets until the quantity of allocated PDCCH candidates and/or CCEs for the USS 545 over the $X_2$ slots is less than or equal to the remaining PDCCH candidate budget and/or the remaining CCE budget over the $X_2$ slots. The one or more USS sets may be identified based at least in part on index values or identifiers associated with the one or more USS sets. For example, each USS set may be associated with an index value (e.g., a searchSpaceID). The UE 120 may drop (e.g., refrain from monitoring) USS sets one-by-one in an order indicated by the index values. In some aspects, the order may be from a highest index value to a lowest index value. In some other aspects, the order may be from a lowest index value to a highest index value. For example, the UE 120 may first drop a first USS set (e.g., the USS set associated with a highest index value). The UE 120 may determine whether the quantity of PDCCH candidates and/or CCEs allocated for the USS 545 over the $X_2$ slots is less than or equal to the remaining PDCCH candidate budget and/or the remaining CCE budget over the $X_2$ slots. If the quantity of PDCCH candidates and/or CCEs allocated for the USS 545 over the $X_2$ slots is greater than the remaining PDCCH candidate budget and/or the remaining CCE budget over the $X_2$ slots, then the UE 120 may drop a second USS set (e.g., a USS set associated with a second highest index value after the first USS set). After dropping the second USS set, the UE 120 may determine whether the quantity of PDCCH candidates and/or CCEs allocated for the USS 545 over the $X_2$ slots is less than or equal to the remaining PDCCH candidate budget and/or the remaining CCE budget over the $X_2$ slots. The UE 120 may continue to drop USS sets in this one-by-one manner until the quantity of PDCCH candidates and/or CCEs allocated for the USS 545 over the $X_2$ slots is less than or equal to the remaining PDCCH candidate budget and/or the remaining CCE budget over the $X_2$ slots or until no USS sets remain.

For example, as shown in FIG. 5C, the UE 120 may drop the second USS set (e.g., USS2). After dropping the second USS set, the UE 120 may be configured with only the USS1, resulting in eight BDs/PDCCH candidates and sixteen CCEs being configured for the USS 545 over the $X_2$ slots (e.g., four BDs/PDCCH candidates and eight CCEs in the first $X_1$ slots and four BDs/PDCCH candidates and eight CCEs in the second $X_1$ slots). Because eight PDCCH candidates is less than the remaining PDCCH candidate budget of thirteen and because sixteen CCEs is equal to the remaining CCE budget, the UE 120 may be enabled to monitor the USS1 as configured. For example, the UE 120 may allocate the blind decodings/PDCCH candidates and/or the CCEs for the first USS set associated with the first configuration.

For example, returning to FIG. 5A, as shown by reference number 530, the UE 120 may monitor the downlink control channel via the first USS set and/or the CSS. The UE 120 may refrain from monitoring one or more USS sets (e.g., the USS2) associated with the first configuration based at least in part on the quantity of blind decodings or CCEs associated with the first configuration exceeding the remaining blind decoding or CCE budget over the first quantity of slots, as described in more detail elsewhere herein.

Figure 5D:
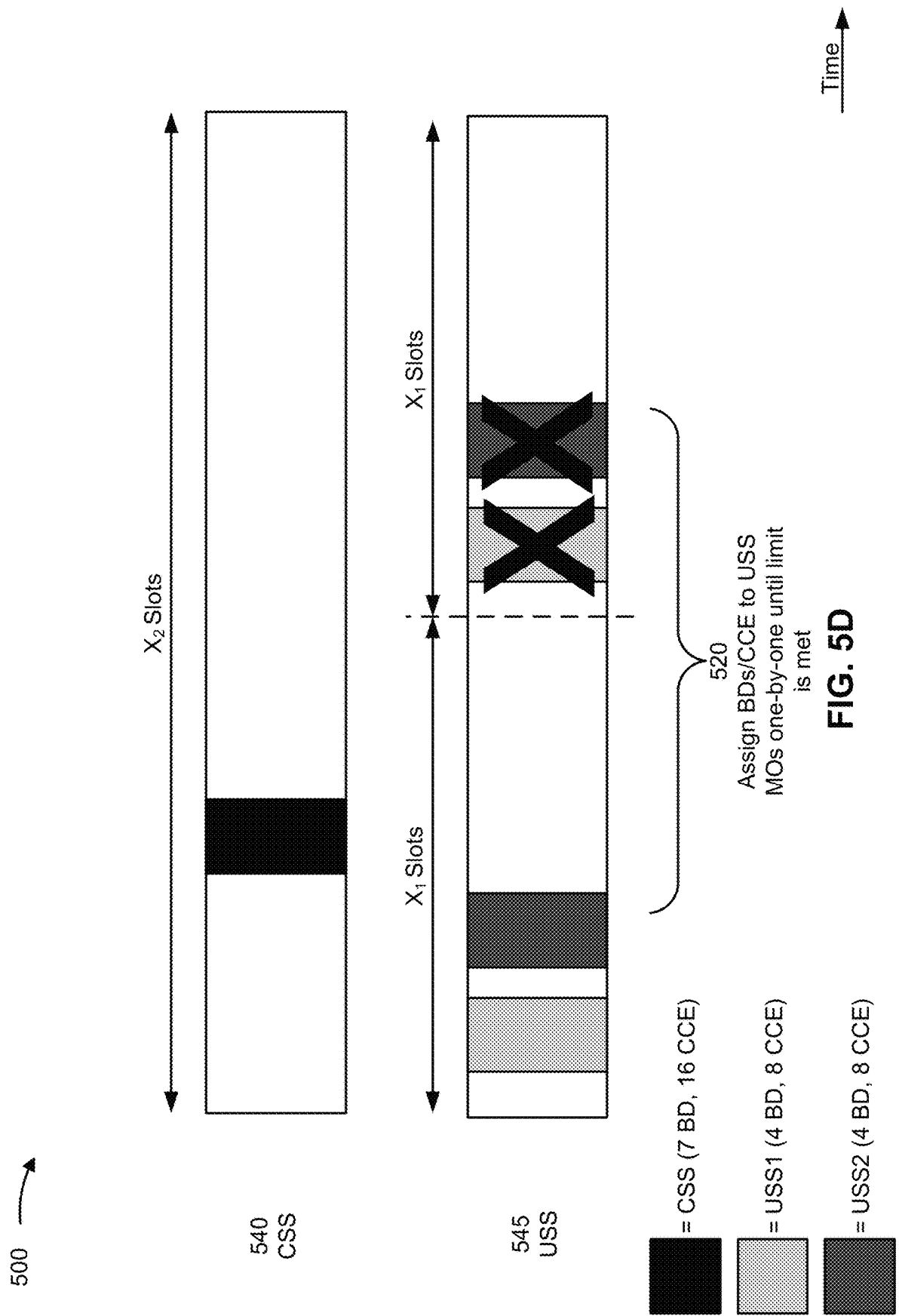

FIG. 5D depicts another example of overbooking and/or dropping rules. For example, the UE 120 may allocate blind decodings/PDCCH candidates and/or CCEs for the one or more USS sets associated with the first configuration until the remaining blind decoding/PDCCH or CCE budget over the first quantity of slots (e.g., over the $X_2$ slots) is met. For example, the UE 120 may allocate PDCCH candidates and/or CCEs to USS MOs in a one-by-one manner over time until the remaining PDCCH candidate budget and/or the remaining CCE budget is met. For example, the remaining PDCCH candidate budget may be thirteen and the remaining CCE budget may be sixteen (e.g., after allocating PDCCH candidates and/or CCEs to the CSS 540). The UE 120 may allocate PDCCH candidates (e.g., four PDCCH candidates) and CCEs (e.g., eight CCEs) to a first monitoring occasion of the USS1. This may result in a new remaining PDCCH candidate budget of nine and a new remaining CCE budget of eight. The UE 120 may allocate PDCCH candidates (e.g., four PDCCH candidates) and CCEs (e.g., eight CCEs) to a first monitoring occasion of the USS2. This may result in a new remaining PDCCH candidate budget of five and a new remaining CCE budget of zero. Because there are no remaining CCEs available to be allocated over the $X_2$ slots, the UE 120 may drop (e.g., refrain from monitoring) the remaining configured monitoring occasions for the USS 545 (e.g., in the second $X_1$ slots). For example, the UE 120 may monitor the downlink control channel via the one or more USS sets (e.g., the MOs in the first $X_1$ slots). The UE 120 may refrain from monitoring (e.g., may drop) the USS in any remaining USS MOs associated with the first configuration based at least in part on a quantity of blind decodings or CCEs associated with the first configuration exceeding the remaining blind decoding or CCE budget over the first quantity of slots (e.g., over the $X_2$ slots).

FIG. 5E depicts another example of overbooking and/or dropping rules. As shown in FIGS. 5B-5G, a quantity of slot groups (e.g., two in the example shown) associated with the USS 545 may overlap with a single slot group associated with the CSS 540. In some aspects, when allocating PDCCH candidates and/or CCEs for the USS 545, the UE 120 may allocate a first portion of the blind decodings or the CCEs for a first set of slots (e.g., for a first one or more slot groups), over the first quantity of slots indicated by the second slot group size (e.g., over the $X_2$ slots), for a first one or more USS sets associated with the first configuration. The UE 120 may allocate a second portion of the blind decodings or the CCEs for a second set of slots (e.g., for a second one or more slot groups), over the first quantity of slots indicated by the second slot group size (e.g., over the $X_2$ slots), for the first one or more USS sets associated with the first configuration. In other words, the UE 120 may allocate the first portion of the blind decodings or the CCEs for the first $X_1$ slots and the second portion of the blind decodings or the CCEs for the second $X_1$ slots. In some aspects, the first portion and the second portion may be the same. In other words, the UE 120 may evenly distribute the remaining blind decoding/PDCCH budget and/or the remaining CCE budget over slot groups associated with the USS 545 that overlap with the $X_2$ slots. In some other aspects, the first portion and the second portion may be different.

For example, the remaining PDCCH candidate budget may be thirteen, as described in the examples above. The UE 120 may allocate the remaining PDCCH candidate budget divided by K (e.g., where $X_2=K \cdot X_1$) to each slot group associated with the USS that overlaps with a single slot group of the CSS. In this example, K is equal to two. Therefore, the UE 120 may allocate six PDCCH candidates to the first $X_1$ slots and seven PDCCH candidates to the second $X_1$ slots. Alternatively, the UE 120 may allocate seven PDCCH candidates to the first $X_1$ slots and six PDCCH candidates to the second $X_1$ slots. For example, when the remaining PDCCH candidate budget divided by K is not a whole number (e.g., 6.5 in this example), the UE 120 may round the value up to a nearest integer (e.g., 7) for a first slot group and may round the number down to a nearest integer (e.g., 6) for a second slot group. As another example, the UE 120 may allocate the remaining CCE budget divided by K to each slot group associated with the USS that overlaps with a single slot group of the CSS. For example, the remaining CCE budget may be sixteen and K may be two. Therefore, the UE 120 may allocate eight CCEs for the first $X_1$ slots and eight CCEs for the second $X_1$ slots. The UE 120 may also consider the PDCCH candidate limit and/or CCE limit for a given set of $X_1$ slots when allocating the PDCCH candidates and/or CCEs. For example, the UE 120 may allocate a minimum value between the PDCCH candidate limit for $X_1$ slots and the remaining PDCCH candidate budget divided by K. Similarly, the UE 120 may allocate a minimum value between the CCE limit for $X_1$ slots and the remaining CCE budget divided by K.

As shown in FIG. 5E as an example, the UE 120 may allocate six PDCCH candidates and eight CCEs for the first $X_1$ slots. The UE 120 may allocate seven PDCCH candidates and eight CCEs for the second $X_1$ slots. As shown in FIG. 5E, eight BDs (e.g., eight PDCCH candidates) and sixteen CCEs may be configured for each $X_1$ slots. Therefore, the UE 120 may apply one or more overbooking and/or dropping rules. The UE 120 may apply the overbooking and/or dropping rules separately for each slot group of $X_1$ slots. For example, the UE 120 may drop (e.g., refrain from monitoring) one or more USS sets until the quantity of PDCCH candidates and/or CCEs to be monitored by the UE 120 is less than or equal to the quantity of allocated PDCCH candidates and/or CCEs for each slot group of $X_1$ slots. For example, the UE 120 may drop the USS2 in the first slot group of $X_1$ slots, resulting in the four PDCCH candidates and eight CCEs being allocated for each slot group (e.g., which is less than or equal to the allocated budget of PDCCH candidates (six) and CCEs (eight)). Therefore, the UE 120 may monitor the downlink control channel via the first one or more USS sets (e.g., the USS1) in the first set of $X_1$ slots and the second set of $X_1$ slots. Similarly, the UE 120 may drop the USS2 in the second slot group of $X_1$ slots, resulting in the four PDCCH candidates and eight CCEs being allocated for each slot group (e.g., which is less than or equal to the allocated budget of PDCCH candidates (seven) and CCEs (eight)). For example, in some aspects, the UE 120 may refrain from monitoring (e.g., may drop) the USS in the first set of $X_1$ slots for a second one or more USS sets based at least in part on a quantity of blind decodings or CCEs associated with the first configuration exceeding the first portion of the blind decodings or CCEs. Similarly, the UE 120 may refrain from monitoring the USS in the second set of slots for a third one or more USS sets based at least in part on the quantity of blind decodings or CCEs associated with the first configuration exceeding the second portion of the blind decodings or CCEs.

FIG. 5F depicts another example of overbooking and/or dropping rules. As shown in FIG. 5F, in some aspects, the UE 120 may monitor the USS in one or more slot groups that overlap with a single CSS slot group and may drop USS sets in one or more slot groups (e.g., the remaining slot groups) that overlap with the single CSS slot group. For example, the remaining PDCCH candidate budget and/or remaining CCE budget may be applied to only one or more (but not all) of the USS slot groups that overlap in time with the CSS slot group. For example, as shown in FIG. 5F, the remaining PDCCH candidate budget (e.g., thirteen) and/or remaining CCE budget (e.g., sixteen) may be applied to the first slot group of $X_1$ slots. The second slot group of $X_1$ slots may be dropped (e.g., may not be monitored by the UE 120). Because the MOs configured in the first slot group of $X_1$ slots combine to eight PDCCH candidates (e.g., which is less than the remaining PDCCH candidate budget of thirteen) and sixteen CCEs (e.g., which is equal to the remaining CCE budget of sixteen), the UE 120 may monitor both the USS1 and the USS2 in the first slot group of $X_1$ slots. If the PDCCH candidates and/or CCEs configured in the first slot group of $X_1$ slots is greater than the remaining PDCCH candidate budget and/or remaining CCE budget, the UE 120 may drop one or more USS sets configured within the first slot group of $X_1$ slots (e.g., in a similar manner as described in more detail elsewhere herein).

For example, the UE 120 may allocate the blind decodings or the CCEs for a first set of slots, over the first quantity of slots (e.g., $X_2$) indicated by the second slot group size, where the first set of slots includes a second quantity (e.g., $X_1$) of slots indicated by the first slot group size. The UE 120 may monitor the downlink control channel via the USS in the first set of slots. The UE 120 may refrain from monitoring the USS in a second set of slots based at least in part on a quantity of blind decodings or CCEs associated with the first configuration exceeding the remaining blind decoding or CCE budget over the first quantity of slots, where the second set of slots includes the second quantity of slots. In some aspects, the second set of slots are identified by the UE based at least in part on a time domain location of a CSS measurement occasion indicated by the second configuration. For example, the UE 120 may drop a first one or more slot groups associated with the USS in time. Alternatively, the UE 120 may drop a last one or more slot groups associated with the USS in time.

FIG. 5G depicts another example of overbooking and/or dropping rules. As shown in FIG. 5G, in some aspects, the overbooking and/or dropping rules may indicate that the UE 120 is to drop (e.g., not monitor) any USS MOs that are configured in a slot group that at least partially overlaps with a CSS slot group that includes a configured CSS MO. For example, as shown in FIG. 5G, the first slot group of $X_1$ slots and the second slot group of $X_1$ slots may overlap in time with the CSS slot group of $X_2$ slots (e.g., that includes a configured CSS MO). The UE 120 may monitor, via the CSS, the downlink control channel in accordance with the search space configuration. The UE 120 may refrain from monitoring the downlink control channel (e.g., may drop) via the USS based at least in part on the USS being configured in one or more slot groups that overlap in the time domain with a slot group associated with the CSS. In other words, regardless of a remaining PDCCH candidate budget or remaining CCE budget, the UE 120 may drop all USSs in slot groups of $X_1$ slots that overlap in the time domain with a CSS slot group of $X_2$ slots.

In some aspects, if a CSS is not configured, then the UE 120 may apply legacy overbooking and/or dropping rules (e.g., as defined, or otherwise fixed, by a wireless communication standard, such as Release 17 or Release 16 of a 3GPP Technical Specification). In some aspects, the UE 120 may monitor, via the USS, the downlink control channel in accordance with the search space configuration based at least in part on no CSS measurement occasions being configured in a first slot group that at least partially overlaps in a time domain with a second slot group associated with the USS.

Returning to FIG. 5A, as shown by reference number 535, the UE 120 may receive a PDCCH communication based at least in part on monitoring the PDCCH (e.g., via the CSS and/or the USS) in accordance with the search space configuration. For example, the PDCCH communication may be transmitted (e.g., by the network entity 505 or by another network entity) in the CSS or the USS. In some aspects, the network entity 505 may transmit, via the USS, one or more signals using a downlink control channel in accordance with the search space configuration based at least in part on not configuring any CSS measurement occasions in a first slot group that at least partially overlaps in a time domain with a second slot group associated with the USS. In some aspects, the network entity 505 may refrain from transmitting a downlink signal via a USS and/or a MO that has been dropped by the UE 120. Based at least in part on the search space configuration in which the CSS and the USS are associated with different slot group sizes, performance of the PDCCH communication may be improved.

For example, using different slot group sizes for CSS sets and USS sets may improve a flexibility for PDCCH candidate and/or CCE assignment. For example, a CSS may be associated with a first slot group size (e.g., that is associated with a first PDCCH limit, first BD limit, and/or first CCE limit). A USS may be associated with a second slot group size (e.g., that is associated with a second PDCCH limit, second BD limit, and/or second CCE limit). Therefore, the UE 120 may be enabled to assign more PDCCH candidates and/or CCEs for the CSS (e.g., over the larger slot group size that is associated with a larger PDCCH limit, BD limit, and/or CCE limit) (e.g., because the CSS may be associated with more PDCCH candidates and/or CCEs than a USS). The UE 120 may be enabled to assign PDCCH candidates and/or CCEs for the USS over the smaller slot group size (e.g., based at least in part on a remaining PDCCH candidate or CCE budget after allocating resources for the CSS set(s)) to conserve resources and/or ensure that the UE is enabled to enter a sleep state or micro-sleep state. Therefore, the search space configuration that is associated with different slot group sizes for CSS sets and USS sets may improve a flexibility for PDCCH candidate and/or CCE assignment.

As indicated above, FIGS. 5A-5G are provided as examples. Other examples may differ from what is described with respect to FIGS. 5A-5G.

Figure 6:
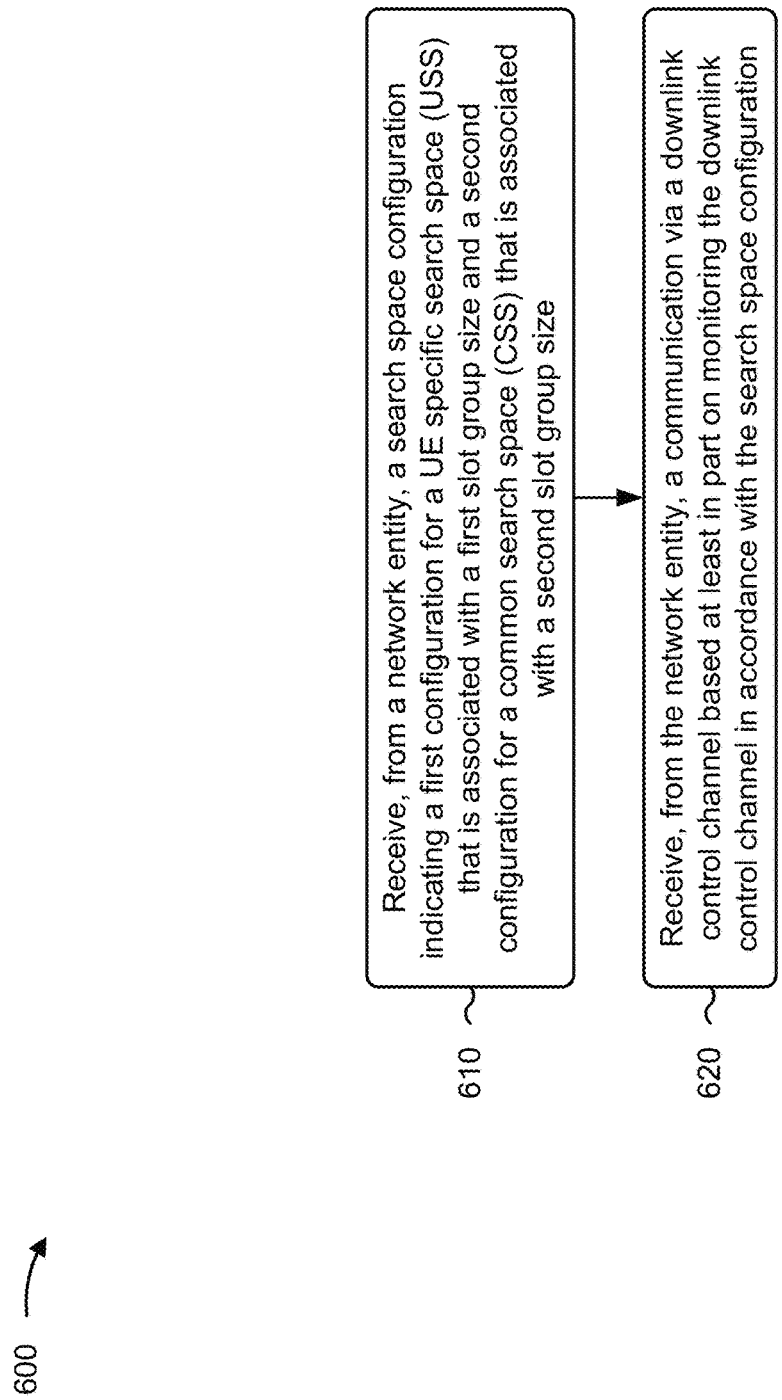
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with USS and CSS assignment for multiple slot based control channel monitoring.

As shown in FIG. 6, in some aspects, process 600 may include receiving, from a network entity, a search space configuration indicating a first configuration for a USS that is associated with a first slot group size and a second configuration for a CSS that is associated with a second slot group size (block 610). For example, the UE (e.g., using communication manager 140 and/or reception component 802, depicted in FIG. 8) may receive, from a network entity, a search space configuration indicating a first configuration for a USS that is associated with a first slot group size and a second configuration for a CSS that is associated with a second slot group size, as described above.

As further shown in FIG. 6, in some aspects, process 600 may include receiving, from the network entity, a communication via a downlink control channel based at least in part on monitoring the downlink control channel in accordance with the search space configuration (block 620). For example, the UE (e.g., using communication manager 140 and/or reception component 802, depicted in FIG. 8) may receive, from the network entity, a communication via a downlink control channel based at least in part on monitoring the downlink control channel in accordance with the search space configuration, as described above.

Process 600 may include additional aspects, such as any single aspect or any combination of aspects described below and/or in connection with one or more other processes described elsewhere herein.

In a first aspect, process 600 includes monitoring, via at least one of the USS or the CSS, the downlink control channel in accordance with the search space configuration.

In a second aspect, alone or in combination with the first aspect, process 600 includes transmitting, to the network entity, a capability report indicating at least one of a first supported first slot group size for USSs or a second supported slot group size for CSSs, wherein the search space configuration is based at least in part on the capability report.

In a third aspect, alone or in combination with one or more of the first and second aspects, process 600 includes receiving, from the network entity, an indication of at least one of the first slot group size or the second slot group size.

In a fourth aspect, alone or in combination with one or more of the first through third aspects, the indication is included in at least one of an RRC communication or a system information communication.

In a fifth aspect, alone or in combination with one or more of the first through fourth aspects, a first blind decoding limit or a first CCE limit associated with monitoring the downlink control channel via the USS is based at least in part on the first slot group size, and a second blind decoding limit or a second CCE limit associated with monitoring the downlink control channel via the CSS is based at least in part on the second slot group size.

In a sixth aspect, alone or in combination with one or more of the first through fifth aspects, the first slot group size is smaller than or equal to the second slot group size.

In a seventh aspect, alone or in combination with one or more of the first through sixth aspects, the second slot group size is an integer multiple of the first slot group size.

In an eighth aspect, alone or in combination with one or more of the first through seventh aspects, process 600 includes allocating blind decodings or CCEs for the CSS, over a first quantity of slots indicated by the second slot group size, based at least in part on a first blind decoding limit or a first CCE limit that is based at least in part on the second slot group size to obtain a remaining blind decoding or CCE budget, and allocating blind decodings or CCEs for the USS, over the first quantity of slots indicated by the second slot group size, based at least in part on the remaining blind decoding or CCE budget.

In a ninth aspect, alone or in combination with one or more of the first through eighth aspects, allocating the blind decodings or the CCEs for the USS includes allocating the blind decodings or CCEs for the USS, over a second quantity of slots indicated by the first slot group size, based at least in part on a blind decoding limit or a CCE limit that is based at least in part on the first slot group size.

In a tenth aspect, alone or in combination with one or more of the first through ninth aspects, allocating the blind decodings or the CCEs for the USS includes allocating the blind decodings or the CCEs for a first USS set associated with the first configuration, and process 600 includes monitoring the downlink control channel via the first USS set, and refraining from monitoring one or more USS sets associated with the first configuration based at least in part on a quantity of blind decodings or CCEs associated with the first configuration exceeding the remaining blind decoding or CCE budget over the first quantity of slots.

In an eleventh aspect, alone or in combination with one or more of the first through tenth aspects, the one or more USS sets are identified based at least in part on index values or identifiers associated with the one or more USS sets.

In a twelfth aspect, alone or in combination with one or more of the first through eleventh aspects, allocating the blind decodings or the CCEs for the USS includes allocating the blind decodings or the CCEs for one or more USS sets associated with the first configuration until the remaining blind decoding or CCE budget over the first quantity of slots is met, and process 600 includes monitoring the downlink control channel via the one or more USS sets, and refraining from monitoring the USS in any remaining USS sets associated with the first configuration based at least in part on a quantity of blind decodings or CCEs associated with the first configuration exceeding the remaining blind decoding or CCE budget over the first quantity of slots.

In a thirteenth aspect, alone or in combination with one or more of the first through twelfth aspects, allocating the blind decodings or the CCEs for the USS includes allocating a first portion of the blind decodings or the CCEs for a first set of slots indicated by the first slot group size, over the first quantity of slots indicated by the second slot group size, for a first one or more USS sets associated with the first configuration, and allocating a second portion of the blind decodings or the CCEs for a second set of slots indicated by the first slot group size, over the first quantity of slots indicated by the second slot group size, for the first one or more USS sets associated with the first configuration.

In a fourteenth aspect, alone or in combination with one or more of the first through thirteenth aspects, process 600 includes monitoring the downlink control channel via the first one or more USS sets in the first set of slots and the second set of slots.

In a fifteenth aspect, alone or in combination with one or more of the first through fourteenth aspects, process 600 includes refraining from monitoring a first one or more USS sets in the first set of slots based at least in part on the index values or identifiers associated with the first one or more USS sets and the quantity of blind decodings or CCEs associated with the first configuration exceeding the first portion of the blind decodings or CCEs; or refraining from monitoring a second one or more USS sets in the second set of slots based at least in part on the index values or identifiers associated with the second one or more USS sets and the quantity of blind decodings or CCEs associated with the first configuration exceeding the second portion of the blind decodings or CCEs.

In a sixteenth aspect, alone or in combination with one or more of the first through fifteenth aspects, allocating the blind decodings or the CCEs for the USS includes allocating the blind decodings or the CCEs for a first set of slots, over the first quantity of slots indicated by the second slot group size, wherein the first set of slots includes a second quantity of slots indicated by the first slot group size, and process 600 includes monitoring the downlink control channel via the USS in the first set of slots, and refraining from monitoring the USS in a second set of slots based at least in part on a quantity of blind decodings or CCEs associated with the first configuration exceeding the remaining blind decoding or CCE budget over the first quantity of slots, wherein the second set of slots includes the second quantity of slots.

In a seventeenth aspect, alone or in combination with one or more of the first through sixteenth aspects, the second set of slots are identified by the UE based at least in part on a time domain location of a CSS measurement occasion indicated by the second configuration.

In an eighteenth aspect, alone or in combination with one or more of the first through seventeenth aspects, process 600 includes monitoring, via the CSS, the downlink control channel in accordance with the search space configuration, and refraining from monitoring the downlink control channel via the USS based at least in part on the USS being configured in one or more slot groups that overlap in a time domain with a slot group associated with the CSS.

In a nineteenth aspect, alone or in combination with one or more of the first through eighteenth aspects, process 600 includes monitoring, via the USS, the downlink control channel in accordance with the search space configuration based at least in part on no CSS measurement occasions being configured in a first slot group that at least partially overlaps in a time domain with a second slot group associated with the USS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
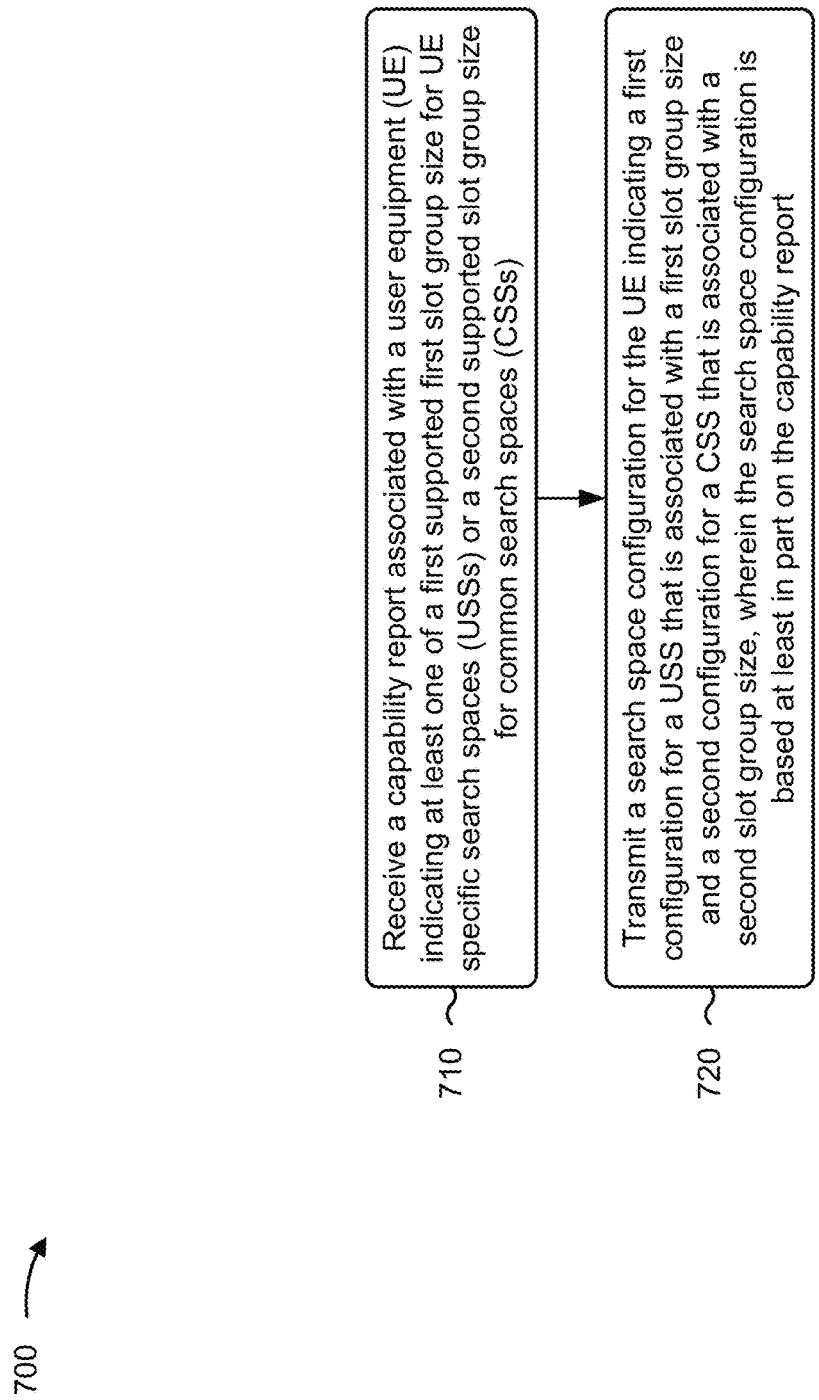
FIG. 7 is a diagram illustrating an example process performed, for example, by a network entity, in accordance with the present disclosure.

FIG. 7 is a diagram illustrating an example process 700 performed, for example, by a network entity, in accordance with the present disclosure. Example process 700 is an example where the network entity (e.g., the network entity 505, a base station 110, a CU, a DU, and/or an RU) performs operations associated with USS and CSS assignment for multiple slot based control channel monitoring.

As shown in FIG. 7, in some aspects, process 700 may include receiving a capability report associated with a UE indicating at least one of a first supported first slot group size for USSs or a second supported slot group size for CSSs (block 710). For example, the network entity (e.g., using communication manager 150 and/or reception component 902, depicted in FIG. 9) may receive a capability report associated with a UE indicating at least one of a first supported first slot group size for USSs or a second supported slot group size for CSSs, as described above.

As further shown in FIG. 7, in some aspects, process 700 may include transmitting a search space configuration for the UE indicating a first configuration for a USS that is associated with a first slot group size and a second configuration for a CSS that is associated with a second slot group size, wherein the search space configuration is based at least in part on the capability report (block 720). For example, the network entity (e.g., using communication manager 150 and/or transmission component 904, depicted in FIG. 9) may transmit a search space configuration for the UE indicating a first configuration for a USS that is associated with a first slot group size and a second configuration for a CSS that is associated with a second slot group size, wherein the search space configuration is based at least in part on the capability report, as described above.

Process 700 may include additional aspects, such as any single aspect or any combination of aspects described below and/or in connection with one or more other processes described elsewhere herein.

In a first aspect, process 700 includes transmitting a communication via a downlink control channel in accordance with the search space configuration.

In a second aspect, alone or in combination with the first aspect, process 700 includes transmitting an indication of at least one of the first slot group size or the second slot group size.

In a third aspect, alone or in combination with one or more of the first and second aspects, the indication is included in at least one of an RRC communication or a system information communication.

In a fourth aspect, alone or in combination with one or more of the first through third aspects, a first blind decoding limit or a first CCE limit associated with monitoring a downlink control channel via the USS is based at least in part on the first slot group size, and a second blind decoding limit or a second CCE limit associated with monitoring a downlink control channel via the CSS is based at least in part on the second slot group size.

In a fifth aspect, alone or in combination with one or more of the first through fourth aspects, the first slot group size is smaller than or equal to the second slot group size.

In a sixth aspect, alone or in combination with one or more of the first through fifth aspects, the second slot group size is an integer multiple of the first slot group size.

In a seventh aspect, alone or in combination with one or more of the first through sixth aspects, process 700 includes allocating blind decodings or CCEs for the CSS, over a first quantity of slots indicated by the second slot group size, based at least in part on a first blind decoding limit or a first CCE limit that is based at least in part on the second slot group size to obtain a remaining blind decoding or CCE budget, and allocating blind decodings or CCEs for the USS, over the first quantity of slots indicated by the second slot group size, based at least in part on the remaining blind decoding or CCE budget.

In an eighth aspect, alone or in combination with one or more of the first through seventh aspects, allocating the blind decodings or the CCEs for the USS includes allocating the blind decodings or the CCEs for the USS, over a second quantity of slots indicated by the first slot group size, based at least in part on a blind decoding limit or a CCE limit that is based at least in part on the first slot group size.

In a ninth aspect, alone or in combination with one or more of the first through eighth aspects, allocating the blind decodings or the CCEs for the USS includes allocating the blind decodings or the CCEs for a first USS set associated with the first configuration, and refraining from transmitting via one or more USS sets associated with the first configuration based at least in part on a quantity of blind decodings or CCEs associated with the first configuration exceeding the remaining blind decoding or CCE budget over the first quantity of slots.

In a tenth aspect, alone or in combination with one or more of the first through ninth aspects, the one or more USS sets are identified based at least in part on index values or identifiers associated with the one or more USS sets.

In an eleventh aspect, alone or in combination with one or more of the first through tenth aspects, allocating the blind decodings or the CCEs for the USS includes allocating the blind decodings or the CCEs for one or more USS sets associated with the first configuration until the remaining blind decoding or CCE budget over the first quantity of slots is met, and refraining from transmitting via the USS in any remaining USS sets associated with the first configuration based at least in part on a quantity of blind decodings or CCEs associated with the first configuration exceeding the remaining blind decoding or CCE budget over the first quantity of slots.

In a twelfth aspect, alone or in combination with one or more of the first through eleventh aspects, allocating the blind decodings or the CCEs for the USS includes allocating a first portion of the blind decodings or the CCEs for a first set of slots indicated by the first slot group size, over the first quantity of slots indicated by the second slot group size, for a first one or more USS sets associated with the first configuration, and allocating a second portion of the blind decodings or the CCEs for a second set of slots indicated by the first slot group size, over the first quantity of slots indicated by the second slot group size, for the first one or more USS sets associated with the first configuration.

In a thirteenth aspect, alone or in combination with one or more of the first through twelfth aspects, process 700 includes refraining from transmitting via a first one or more USS sets in the first set of slots based at least in part on the index values or identifiers associated with the first one or more USS sets and the quantity of blind decodings or CCEs associated with the first configuration exceeding the first portion of the blind decodings or CCEs; or refraining from transmitting via a second one or more USS sets in the second set of slots based at least in part on the index values or identifiers associated with the second one or more USS sets and the quantity of blind decodings or CCEs associated with the first configuration exceeding the second portion of the blind decodings or CCEs.

In a fourteenth aspect, alone or in combination with one or more of the first through thirteenth aspects, allocating the blind decodings or the CCEs for the USS includes allocating the blind decodings or the CCEs for a first set of slots, over the first quantity of slots indicated by the second slot group size, wherein the first set of slots includes a second quantity of slots indicated by the first slot group size, and refraining from transmitting via the USS in a second set of slots based at least in part on a quantity of blind decodings or CCEs associated with the first configuration exceeding the remaining blind decoding or CCE budget over the first quantity of slots, wherein the second set of slots includes the second quantity of slots.

In a fifteenth aspect, alone or in combination with one or more of the first through fourteenth aspects, the second set of slots are identified based at least in part on a time domain location of a CSS measurement occasion indicated by the second configuration.

In a sixteenth aspect, alone or in combination with one or more of the first through fifteenth aspects, process 700 includes refraining from transmitting using a downlink control channel via the USS based at least in part on the USS being configured in one or more slot groups that overlap in a time domain with a slot group associated with the CSS.

In a seventeenth aspect, alone or in combination with one or more of the first through sixteenth aspects, process 700 includes transmitting, via the USS, one or more signals using a downlink control channel in accordance with the search space configuration based at least in part on not configuring any CSS measurement occasions in a first slot group that at least partially overlaps in a time domain with a second slot group associated with the USS.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
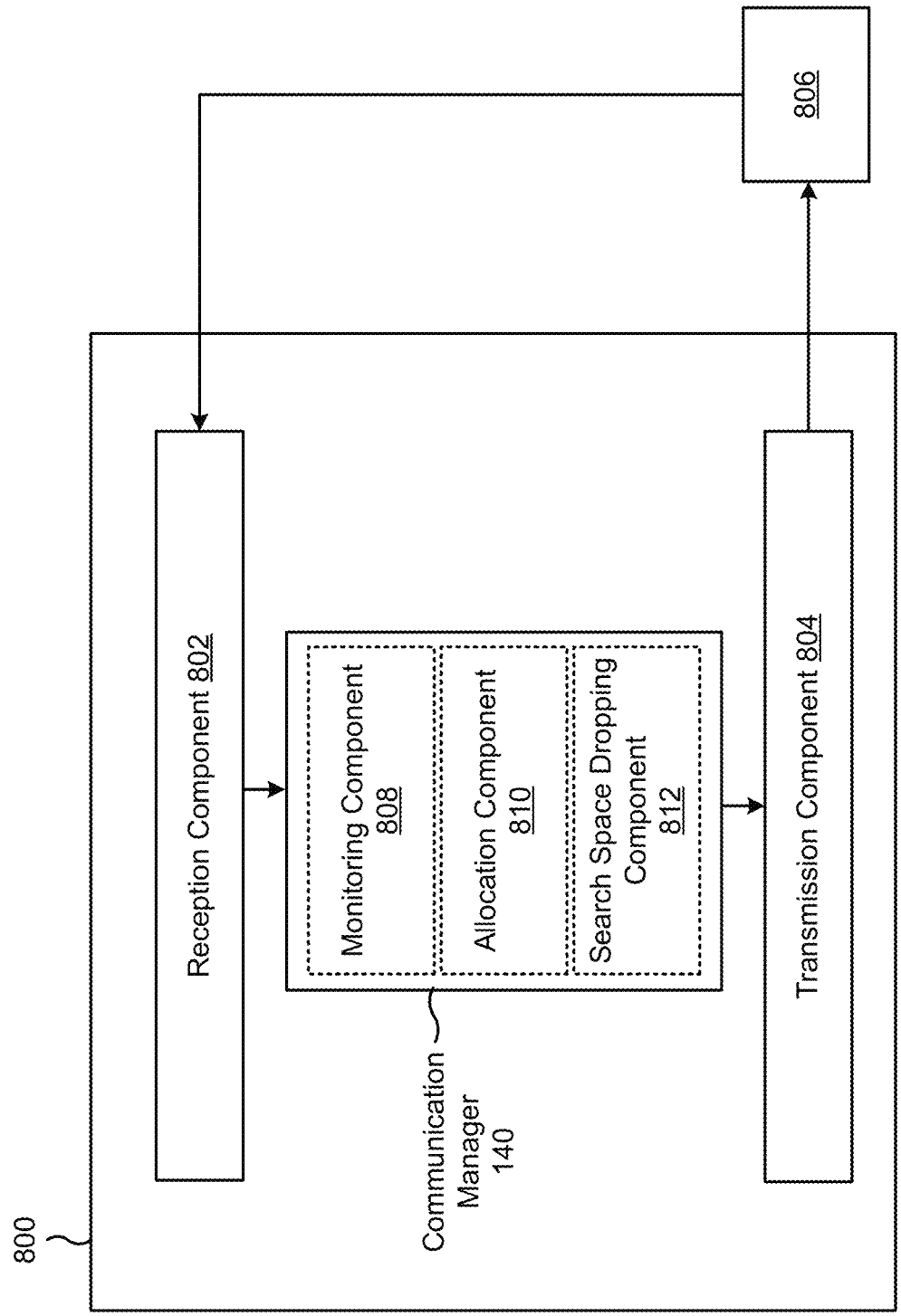
FIG. 8 is a diagram of an example apparatus for wireless communication.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a monitoring component 808, an allocation component 810, or a search space dropping component 812, among other examples.

In some aspects, the apparatus 800 may be configured to perform one or more operations described herein in connection with FIGS. 5A-5G. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive, from a network entity, a search space configuration indicating a first configuration for a USS that is associated with a first slot group size and a second configuration for a CSS that is associated with a second slot group size. The reception component 802 may receive, from the network entity, a communication via a downlink control channel based at least in part on monitoring the downlink control channel in accordance with the search space configuration.

The monitoring component 808 may monitor, via at least one of the USS or the CSS, the downlink control channel in accordance with the search space configuration.

The transmission component 804 may transmit, to the network entity, a capability report indicating at least one of a first supported first slot group size for USSs or a second supported slot group size for CSSs wherein the search space configuration is based at least in part on the capability report.

The reception component 802 may receive, from the network entity, an indication of at least one of the first slot group size or the second slot group size.

The allocation component 810 may allocate blind decodings or CCEs for the CSS, over a first quantity of slots indicated by the second slot group size, based at least in part on a first blind decoding limit or a first CCE limit that is based at least in part on the second slot group size to obtain a remaining blind decoding or CCE budget.

The allocation component 810 may allocate blind decodings or CCEs for the USS, over the first quantity of slots indicated by the second slot group size, based at least in part on the remaining blind decoding or CCE budget.

The monitoring component 808 may monitor the downlink control channel via the first one or more USS sets in the first set of slots and the second set of slots.

The search space dropping component 812 may refrain from monitoring the USS in the first set of slots for a second one or more USS sets based at least in part on a quantity of blind decodings or CCEs associated with the first configuration exceeding the first portion of the blind decodings or CCEs.

The search space dropping component 812 may refrain from monitoring the USS in the second set of slots for a third one or more USS sets based at least in part on the quantity of blind decodings or CCEs associated with the first configuration exceeding the second portion of the blind decodings or CCEs.

The monitoring component 808 may monitor, via the CSS, the downlink control channel in accordance with the search space configuration.

The search space dropping component 812 may refrain from monitoring the downlink control channel via the USS based at least in part on the USS being configured in one or more slot groups that overlap in a time domain with a slot group associated with the CSS.

The monitoring component 808 may monitor, via the USS, the downlink control channel in accordance with the search space configuration based at least in part on no CSS measurement occasions being configured in a first slot group that at least partially overlaps in a time domain with a second slot group associated with the USS.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
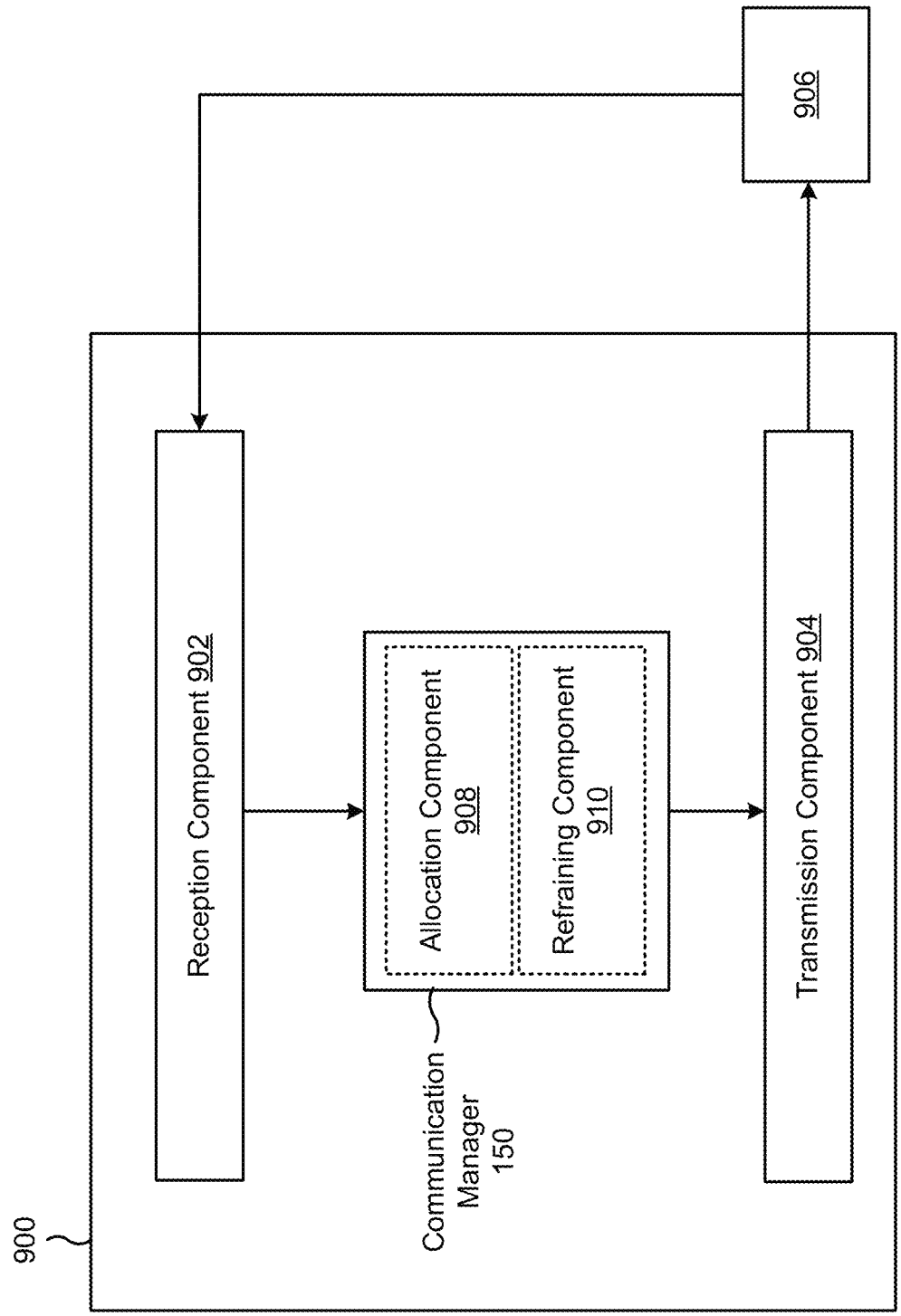
FIG. 9 is a diagram of an example apparatus for wireless communication.

FIG. 9 is a diagram of an example apparatus 900 for wireless communication. The apparatus 900 may be a network entity, or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of an allocation component 908, and/or a refraining component 910, among other examples.

In some aspects, the apparatus 900 may be configured to perform one or more operations described herein in connection with FIGS. 5A-5G. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network entity described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network entity described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network entity described in connection with FIG. 2. In some aspects, the transmission component 904 may be co-located with the reception component 902 in a transceiver.

The reception component 902 may receive a capability report associated with a UE indicating at least one of a first supported first slot group size for USSs or a second supported slot group size for CSSs. The transmission component 904 may transmit a search space configuration for the UE indicating a first configuration for a USS that is associated with a first slot group size and a second configuration for a CSS that is associated with a second slot group size, wherein the search space configuration is based at least in part on the capability report.

The transmission component 904 may transmit a communication via a downlink control channel in accordance with the search space configuration.

The transmission component 904 may transmit an indication of at least one of the first slot group size or the second slot group size.

The allocation component 908 may allocate blind decodings or CCEs for the CSS, over a first quantity of slots indicated by the second slot group size, based at least in part on a first blind decoding limit or a first CCE limit that is based at least in part on the second slot group size to obtain a remaining blind decoding or CCE budget.

The allocation component 908 may allocate blind decodings or CCEs for the USS, over the first quantity of slots indicated by the second slot group size, based at least in part on the remaining blind decoding or CCE budget.

The refraining component 910 may refrain from transmitting via the USS in the first set of slots for a second one or more USS sets based at least in part on a quantity of blind decodings or CCEs associated with the first configuration exceeding the first portion of the blind decodings or CCEs.

The refraining component 910 may refrain from transmitting via the USS in the second set of slots for a third one or more USS sets based at least in part on the quantity of blind decodings or CCEs associated with the first configuration exceeding the second portion of the blind decodings or CCEs.

The refraining component 910 may refrain from transmitting using a downlink control channel via the USS based at least in part on the USS being configured in one or more slot groups that overlap in a time domain with a slot group associated with the CSS.

The transmission component 904 may transmit, via the USS, one or more signals using a downlink control channel in accordance with the search space configuration based at least in part on not configuring any CSS measurement occasions in a first slot group that at least partially overlaps in a time domain with a second slot group associated with the USS.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving, from a network entity, a search space configuration indicating a first configuration for a UE specific search space (USS) that is associated with a first slot group size and a second configuration for a common search space (CSS) that is associated with a second slot group size; and receiving, from the network entity, a communication via a downlink control channel based at least in part on monitoring the downlink control channel in accordance with the search space configuration.

Aspect 2: The method of Aspect 1, further comprising: monitoring, via at least one of the USS or the CSS, the downlink control channel in accordance with the search space configuration.

Aspect 3: The method of any of Aspects 1-2, further comprising: transmitting, to the network entity, a capability report indicating at least one of a first supported first slot group size for USSs or a second supported slot group size for CSSs, wherein the search space configuration is based at least in part on the capability report.

Aspect 4: The method of any of Aspects 1-3, further comprising: receiving, from the network entity, an indication of at least one of the first slot group size or the second slot group size.

Aspect 5: The method of Aspect 4, wherein the indication is included in at least one of a radio resource control (RRC) communication or a system information communication.

Aspect 6: The method of any of Aspects 1-5, wherein a first blind decoding limit or a first control channel element (CCE) limit associated with monitoring the downlink control channel via the USS is based at least in part on the first slot group size, and wherein a second blind decoding limit or a second CCE limit associated with monitoring the downlink control channel via the CSS is based at least in part on the second slot group size.

Aspect 7: The method of any of Aspects 1-6, wherein the first slot group size is smaller than or equal to the second slot group size.

Aspect 8: The method of any of Aspects 1-7, wherein the second slot group size is an integer multiple of the first slot group size.

Aspect 9: The method of any of Aspects 1-8, further comprising: allocating blind decodings or control channel elements (CCEs) for the CSS, over a first quantity of slots indicated by the second slot group size, based at least in part on a first blind decoding limit or a first CCE limit that is based at least in part on the second slot group size to obtain a remaining blind decoding or CCE budget; and allocating blind decodings or CCEs for the USS, over the first quantity of slots indicated by the second slot group size, based at least in part on the remaining blind decoding or CCE budget.

Aspect 10: The method of Aspect 9, wherein allocating the blind decodings or the CCEs for the USS comprises: allocating the blind decodings or CCEs for the USS, over a second quantity of slots indicated by the first slot group size, based at least in part on a blind decoding limit or a CCE limit that is based at least in part on the first slot group size.

Aspect 11: The method of any of Aspects 9-10, wherein allocating the blind decodings or the CCEs for the USS comprises: allocating the blind decodings or the CCEs for a first USS set associated with the first configuration; and wherein the method further comprises: monitoring the downlink control channel via the first USS set; and refraining from monitoring one or more USS sets associated with the first configuration based at least in part on a quantity of blind decodings or CCEs associated with the first configuration exceeding the remaining blind decoding or CCE budget over the first quantity of slots.

Aspect 12: The method of Aspect 11, wherein the one or more USS sets are identified based at least in part on index values or identifiers associated with the one or more USS sets.

Aspect 13: The method of any of Aspects 9-12, wherein allocating the blind decodings or the CCEs for the USS comprises: allocating the blind decodings or the CCEs for one or more USS sets associated with the first configuration until the remaining blind decoding or CCE budget over the first quantity of slots is met; and wherein the method further comprises: monitoring the downlink control channel via the one or more USS sets; and refraining from monitoring the USS in any remaining USS sets associated with the first configuration based at least in part on a quantity of blind decodings or CCEs associated with the first configuration exceeding the remaining blind decoding or CCE budget over the first quantity of slots.

Aspect 14: The method of any of Aspects 9-13, wherein allocating the blind decodings or the CCEs for the USS comprises: allocating a first portion of the blind decodings or the CCEs for a first set of slots indicated by the first slot group size, over the first quantity of slots indicated by the second slot group size, for a first one or more USS sets associated with the first configuration; and allocating a second portion of the blind decodings or the CCEs for a second set of slots indicated by the first slot group size, over the first quantity of slots indicated by the second slot group size, for the first one or more USS sets associated with the first configuration.

Aspect 15: The method of Aspect 14, further comprising: monitoring the downlink control channel via the first one or more USS sets in the first set of slots and the second set of slots.

Aspect 16: The method of any of Aspects 14-15, further comprising: refraining from monitoring a first one or more USS sets in the first set of slots based at least in part on the index values or identifiers associated with the first one or more USS sets and the quantity of blind decodings or CCEs associated with the first configuration exceeding the first portion of the blind decodings or CCEs; or refraining from monitoring a second one or more USS sets in the second set of slots based at least in part on the index values or identifiers associated with the second one or more USS sets and the quantity of blind decodings or CCEs associated with the first configuration exceeding the second portion of the blind decodings or CCEs.

Aspect 17: The method of any of Aspects 9-16, wherein allocating the blind decodings or the CCEs for the USS comprises: allocating the blind decodings or the CCEs for a first set of slots, over the first quantity of slots indicated by the second slot group size, wherein the first set of slots includes a second quantity of slots indicated by the first slot group size; and wherein the method further comprises: monitoring the downlink control channel via the USS in the first set of slots; and refraining from monitoring the USS in a second set of slots based at least in part on a quantity of blind decodings or CCEs associated with the first configuration exceeding the remaining blind decoding or CCE budget over the first quantity of slots, wherein the second set of slots includes the second quantity of slots.

Aspect 18: The method of Aspect 17, wherein the second set of slots are identified by the UE based at least in part on a time domain location of a CSS measurement occasion indicated by the second configuration.

Aspect 19: The method of any of Aspects 1-18, further comprising: monitoring, via the CSS, the downlink control channel in accordance with the search space configuration; and refraining from monitoring the downlink control channel via the USS based at least in part on the USS being configured in one or more slot groups that overlap in a time domain with a slot group associated with the CSS.

Aspect 20: The method of any of Aspects 1-19, further comprising: monitoring, via the USS, the downlink control channel in accordance with the search space configuration based at least in part on no CSS measurement occasions being configured in a first slot group that at least partially overlaps in a time domain with a second slot group associated with the USS.

Aspect 21: A method of wireless communication performed by a network entity, comprising: receiving a capability report associated with a user equipment (UE) indicating at least one of a first supported first slot group size for UE specific search spaces (USSs) or a second supported slot group size for common search space (CSSs); and transmitting a search space configuration for the UE indicating a first configuration for a USS that is associated with a first slot group size and a second configuration for a CSS that is associated with a second slot group size, wherein the search space configuration is based at least in part on the capability report.

Aspect 22: The method of Aspect 21, further comprising: transmitting a communication via a downlink control channel in accordance with the search space configuration.

Aspect 23: The method of any of Aspects 21-22, further comprising: transmitting an indication of at least one of the first slot group size or the second slot group size.

Aspect 24: The method of Aspect 23, wherein the indication is included in at least one of a radio resource control (RRC) communication or a system information communication.

Aspect 25: The method of any of Aspects 21-24, wherein a first blind decoding limit or a first control channel element (CCE) limit associated with monitoring a downlink control channel via the USS is based at least in part on the first slot group size, and wherein a second blind decoding limit or a second CCE limit associated with monitoring a downlink control channel via the CSS is based at least in part on the second slot group size.

Aspect 26: The method of any of Aspects 21-25, wherein the first slot group size is smaller than or equal to the second slot group size.

Aspect 27: The method of any of Aspects 21-26, wherein the second slot group size is an integer multiple of the first slot group size.

Aspect 28: The method of any of Aspects 21-27, further comprising: allocating blind decodings or control channel elements (CCEs) for the CSS, over a first quantity of slots indicated by the second slot group size, based at least in part on a first blind decoding limit or a first CCE limit that is based at least in part on the second slot group size to obtain a remaining blind decoding or CCE budget; and allocating blind decodings or CCEs for the USS, over the first quantity of slots indicated by the second slot group size, based at least in part on the remaining blind decoding or CCE budget.

Aspect 29: The method of Aspect 28, wherein allocating the blind decodings or the CCEs for the USS comprises: allocating the blind decodings or CCEs for the USS, over a second quantity of slots indicated by the first slot group size, based at least in part on a blind decoding limit or a CCE limit that is based at least in part on the first slot group size.

Aspect 30: The method of any of Aspects 28-29, wherein allocating the blind decodings or the CCEs for the USS comprises: allocating the blind decodings or the CCEs for a first USS set associated with the first configuration; and refraining from transmitting via one or more USS sets associated with the first configuration based at least in part on a quantity of blind decodings or CCEs associated with the first configuration exceeding the remaining blind decoding or CCE budget over the first quantity of slots.

Aspect 31: The method of Aspect 30, wherein the one or more USS sets are identified based at least in part on index values or identifiers associated with the one or more USS sets.

Aspect 32: The method of any of Aspects 28-31, wherein allocating the blind decodings or the CCEs for the USS comprises: allocating the blind decodings or the CCEs for one or more USS sets associated with the first configuration until the remaining blind decoding or CCE budget over the first quantity of slots is met; and refraining from transmitting via the USS in any remaining USS sets associated with the first configuration based at least in part on a quantity of blind decodings or CCEs associated with the first configuration exceeding the remaining blind decoding or CCE budget over the first quantity of slots.

Aspect 33: The method of any of Aspects 28-32, wherein allocating the blind decodings or the CCEs for the USS comprises: allocating a first portion of the blind decodings or the CCEs for a first set of slots indicated by the first slot group size, over the first quantity of slots indicated by the second slot group size, for a first one or more USS sets associated with the first configuration; and allocating a second portion of the blind decodings or the CCEs for a second set of slots indicated by the first slot group size, over the first quantity of slots indicated by the second slot group size, for the first one or more USS sets associated with the first configuration.

Aspect 34: The method of Aspect 33, further comprising: refraining from transmitting via the USS in the first set of slots for a second one or more USS sets based at least in part on a quantity of blind decodings or CCEs associated with the first configuration exceeding the first portion of the blind decodings or CCEs; or refraining from transmitting via the USS in the second set of slots for a third one or more USS sets based at least in part on the quantity of blind decodings or CCEs associated with the first configuration exceeding the second portion of the blind decodings or CCEs.

Aspect 35: The method of any of Aspects 28-34, wherein allocating the blind decodings or the CCEs for the USS comprises: allocating the blind decodings or the CCEs for a first set of slots, over the first quantity of slots indicated by the second slot group size, wherein the first set of slots includes a second quantity of slots indicated by the first slot group size; and refraining from transmitting via the USS in a second set of slots based at least in part on a quantity of blind decodings or CCEs associated with the first configuration exceeding the remaining blind decoding or CCE budget over the first quantity of slots, wherein the second set of slots includes the second quantity of slots.

Aspect 36: The method of Aspect 35, wherein the second set of slots are identified based at least in part on a time domain location of a CSS measurement occasion indicated by the second configuration.

Aspect 37: The method of any of Aspects 21-36, further comprising refraining from transmitting using a downlink control channel via the USS based at least in part on the USS being configured in one or more slot groups that overlap in a time domain with a slot group associated with the CSS.

Aspect 38: The method of any of Aspects 21-37, further comprising: transmitting, via the USS, one or more signals using a downlink control channel in accordance with the search space configuration based at least in part on not configuring any CSS measurement occasions in a first slot group that at least partially overlaps in a time domain with a second slot group associated with the USS.

Aspect 39: An apparatus for wireless communication at a device, comprising a processor; memory coupled with the processor; and instructions stored in the memory and executable by the processor to cause the apparatus to perform the method of one or more of Aspects 1-20.

Aspect 40: A device for wireless communication, comprising a memory and one or more processors coupled to the memory, the one or more processors configured to perform the method of one or more of Aspects 1-20.

Aspect 41: An apparatus for wireless communication, comprising at least one means for performing the method of one or more of Aspects 1-20.

Aspect 42: A non-transitory computer-readable medium storing code for wireless communication, the code comprising instructions executable by a processor to perform the method of one or more of Aspects 1-20.

Aspect 43: A non-transitory computer-readable medium storing a set of instructions for wireless communication, the set of instructions comprising one or more instructions that, when executed by one or more processors of a device, cause the device to perform the method of one or more of Aspects 1-20.

Aspect 44: An apparatus for wireless communication at a device, comprising a processor; memory coupled with the processor; and instructions stored in the memory and executable by the processor to cause the apparatus to perform the method of one or more of Aspects 21-38.

Aspect 45: A device for wireless communication, comprising a memory and one or more processors coupled to the memory, the one or more processors configured to perform the method of one or more of Aspects 21-38.

Aspect 46: An apparatus for wireless communication, comprising at least one means for performing the method of one or more of Aspects 21-38.

Aspect 47: A non-transitory computer-readable medium storing code for wireless communication, the code comprising instructions executable by a processor to perform the method of one or more of Aspects 21-38.

Aspect 48: A non-transitory computer-readable medium storing a set of instructions for wireless communication, the set of instructions comprising one or more instructions that, when executed by one or more processors of a device, cause the device to perform the method of one or more of Aspects 21-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, from a network entity, a search space configuration indicating a first configuration for a UE specific search space (USS) that is associated with a first slot group size of a first slot group and a first quantity of consecutive slots within the first slot group and a second configuration for a common search space (CSS) that is associated with a second slot group size of a second slot group and a second quantity of consecutive slots within the second slot group, wherein the second slot group size is an integer multiple of the first slot group size, the integer being greater than one; and
      receive, from the network entity, a communication via a downlink control channel based at least in part on monitoring the downlink control channel in accordance with the search space configuration.

2. The UE of claim 1, wherein the one or more processors are further configured to:
   monitor, via at least one of the USS or the CSS, the downlink control channel in accordance with the search space configuration.

3. The UE of claim 1, wherein the one or more processors are further configured to:
   transmit, to the network entity, a capability report indicating at least one of a first supported first slot group size for USSs or a second supported slot group size for CSSs,
      wherein the search space configuration is based at least in part on the capability report.

4. The UE of claim 1, wherein a first blind decoding limit or a first control channel element (CCE) limit associated with monitoring the downlink control channel via the USS is based at least in part on the first slot group size, and
   wherein a second blind decoding limit or a second CCE limit associated with monitoring the downlink control channel via the CSS is based at least in part on the second slot group size.

5. The UE of claim 1, wherein the first slot group size is smaller than or equal to the second slot group size.

6. The UE of claim 1, wherein the one or more processors are further configured to:
   allocate blind decodings or control channel elements (CCEs) for the CSS, over a first quantity of slots indicated by the second slot group size, based at least in part on a first blind decoding limit or a first CCE limit that is based at least in part on the second slot group size to obtain a remaining blind decoding or CCE budget; and
   allocate blind decodings or CCEs for the USS, over the first quantity of slots indicated by the second slot group size, based at least in part on the remaining blind decoding or CCE budget.

7. The UE of claim 6, wherein the one or more processors, to allocate the blind decodings or the CCEs for the USS, are configured to:
   allocate the blind decodings or CCEs for the USS, over a second quantity of slots indicated by the first slot group size, based at least in part on a blind decoding limit or a CCE limit that is based at least in part on the first slot group size.

8. The UE of claim 6, wherein the one or more processors, to allocate the blind decodings or the CCEs for the USS, are configured to:
   allocate the blind decodings or the CCEs for one or more USS sets associated with the first configuration until the remaining blind decoding or CCE budget over the first quantity of slots is met; and
   wherein the one or more processors are further configured to:
      monitor the downlink control channel via the one or more USS sets; and
      refrain from monitoring the USS in any remaining USS sets associated with the first configuration based at least in part on a quantity of blind decodings or CCEs associated with the first configuration exceeding the remaining blind decoding or CCE budget over the first quantity of slots.

9. The UE of claim 6, wherein the one or more processors, to allocate the blind decodings or the CCEs for the USS, are configured to:
   allocate a first portion of the blind decodings or the CCEs for a first set of slots indicated by the first slot group size, over the first quantity of slots indicated by the second slot group size, for a first one or more USS sets associated with the first configuration; and
   allocate a second portion of the blind decodings or the CCEs for a second set of slots indicated by the first slot group size, over the first quantity of slots indicated by the second slot group size, for the first one or more USS sets associated with the first configuration.

10. The UE of claim 6, wherein the one or more processors, to allocate the blind decodings or the CCEs for the USS, are configured to:
    allocate the blind decodings or the CCEs for a first set of slots, over the first quantity of slots indicated by the second slot group size, wherein the first set of slots includes a second quantity of slots indicated by the first slot group size; and
    wherein the one or more processors are further configured to:

monitor the downlink control channel via the USS in the first set of slots; and refrain from monitoring the USS in a second set of slots based at least in part on a quantity of blind decodings or CCEs associated with the first configuration exceeding the remaining blind decoding or CCE budget over the first quantity of slots, wherein the second set of slots includes the second quantity of slots.

11. The UE of claim 10,
wherein the second set of slots are identified by the UE based at least in part on a time domain location of a CSS measurement occasion indicated by the second configuration.

12. The UE of claim 1,
wherein the one or more processors are further configured to:
monitor, via the CSS, the downlink control channel in accordance with the search space configuration; and
refrain from monitoring the downlink control channel via the USS based at least in part on the USS being configured in one or more slot groups that overlap in a time domain with a slot group associated with the CSS.

13. A network entity for wireless communication, comprising:
one or more memories; and
one or more processors, coupled to the one or more memories, configured to:
receive a capability report associated with a user equipment (UE) indicating at least one of a first supported first slot group size for UE specific search spaces (USSs) or a second supported slot group size for common search space (CSSs); and
transmit a search space configuration for the UE indicating a first configuration for a USS that is associated with a first slot group size of a first slot group and a first quantity of consecutive slots within the first slot group and a second configuration for a CSS that is associated with a second slot group size of a second slot group and a second quantity of consecutive slots within the second slot group, wherein the second slot group size is an integer multiple of the first slot group size, the integer being greater than one, wherein the search space configuration is based at least in part on the capability report.

14. The network entity of claim 13,
wherein the one or more processors are further configured to:
transmit a communication via a downlink control channel in accordance with the search space configuration.

15. The network entity of claim 13,
wherein the one or more processors are further configured to:
transmit an indication of at least one of the first slot group size or the second slot group size.

16. A method of wireless communication performed by a user equipment (UE), comprising:
receiving, from a network entity, a search space configuration indicating a first configuration for a UE specific search space (USS) that is associated with a first slot group size of a first slot group and a first quantity of consecutive slots within the first slot group and a second configuration for a common search space (CSS) that is associated with a second slot group size of a second slot group and a second quantity of consecutive slots within the second slot group, wherein the second slot group size is an integer multiple of the first slot group size, the integer being greater than one; and
receiving, from the network entity, a communication via a downlink control channel based at least in part on monitoring the downlink control channel in accordance with the search space configuration.

17. The method of claim 16, further comprising:
monitoring, via at least one of the USS or the CSS, the downlink control channel in accordance with the search space configuration.

18. The method of claim 16, further comprising:
transmitting, to the network entity, a capability report indicating at least one of a first supported first slot group size for USSs or a second supported slot group size for CSSs,
wherein the search space configuration is based at least in part on the capability report.

19. The method of claim 16, further comprising:
receiving, from the network entity, an indication of at least one of the first slot group size or the second slot group size.

20. The method of claim 16,
wherein a first blind decoding limit or a first control channel element (CCE) limit associated with monitoring the downlink control channel via the USS is based at least in part on the first slot group size, and
wherein a second blind decoding limit or a second CCE limit associated with monitoring the downlink control channel via the CSS is based at least in part on the second slot group size.

21. The method of claim 16, further comprising:
allocating blind decodings or control channel elements (CCEs) for the CSS, over a first quantity of slots indicated by the second slot group size, based at least in part on a first blind decoding limit or a first CCE limit that is based at least in part on the second slot group size to obtain a remaining blind decoding or CCE budget; and
allocating blind decodings or CCEs for the USS, over the first quantity of slots indicated by the second slot group size, based at least in part on the remaining blind decoding or CCE budget.

22. The method of claim 21,
wherein allocating the blind decodings or the CCEs for the USS comprises:
allocating the blind decodings or the CCEs for a first USS set associated with the first configuration; and
wherein the method further comprises:
monitoring the downlink control channel via the first USS set; and
refraining from monitoring one or more USS sets associated with the first configuration based at least in part on a quantity of blind decodings or CCEs associated with the first configuration exceeding the remaining blind decoding or CCE budget over the first quantity of slots.

23. The method of claim 22,
wherein the one or more USS sets are identified based at least in part on index values or identifiers associated with the one or more USS sets.

24. The method of claim 21,
wherein allocating the blind decodings or the CCEs for the USS comprises:
allocating the blind decodings or the CCEs for one or more USS sets associated with the first configuration until the remaining blind decoding or CCE budget over the first quantity of slots is met; and wherein the method further comprises:

monitoring the downlink control channel via the one or more USS sets; and refraining from monitoring the USS in any remaining USS sets associated with the first configuration based at least in part on a quantity of blind decodings or CCEs associated with the first configuration exceeding the remaining blind decoding or CCE budget over the first quantity of slots.

25. The method of claim 21, wherein allocating the blind decodings or the CCEs for the USS comprises:

allocating a first portion of the blind decodings or the CCEs for a first set of slots indicated by the first slot group size, over the first quantity of slots indicated by the second slot group size, for a first one or more USS sets associated with the first configuration; and allocating a second portion of the blind decodings or the CCEs for a second set of slots indicated by the first slot group size, over the first quantity of slots indicated by the second slot group size, for the first one or more USS sets associated with the first configuration.

26. The method of claim 25, further comprising:

monitoring the downlink control channel via the first one or more USS sets in the first set of slots and the second set of slots.

27. The method of claim 25, further comprising:

refraining from monitoring a first one or more USS sets in the first set of slots based at least in part on index values or identifiers associated with the first one or more USS sets and the quantity of blind decodings or CCEs associated with the first configuration exceeding the first portion of the blind decodings or CCEs; or refraining from monitoring a second one or more USS sets in the second set of slots based at least in part on the index values or identifiers associated with the second one or more USS sets and the quantity of blind decodings or CCEs associated with the first configuration exceeding the second portion of the blind decodings or CCEs.

28. The method of claim 16, further comprising:

monitoring, via the CSS, the downlink control channel in accordance with the search space configuration; and refraining from monitoring the downlink control channel via the USS based at least in part on the USS being configured in one or more slot groups that overlap in a time domain with a slot group associated with the CSS.

29. A method of wireless communication performed by a network entity, comprising:

receiving a capability report associated with a user equipment (UE) indicating at least one of a first supported first slot group size for UE specific search spaces (USSs) or a second supported slot group size for common search space (CSSs); and transmitting a search space configuration for the UE indicating a first configuration for a USS that is associated with a first slot group size of a first slot group and a first quantity of consecutive slots within the first slot group and a second configuration for a CSS that is associated with a second slot group size of a second slot group and a second quantity of consecutive slots within the second slot group, wherein the second slot group size is an integer multiple of the first slot group size, the integer being greater than one, wherein the search space configuration is based at least in part on the capability report.

30. The method of claim 29, further comprising:

transmitting a communication via a downlink control channel in accordance with the search space configuration.

\* \* \* \* \*